United States Patent
Kim et al.

(10) Patent No.: US 11,057,825 B2
(45) Date of Patent: *Jul. 6, 2021

(54) METHOD AND APPARATUS FOR TRANSMITTING DOWNLINK CONTROL INFORMATION IN WIRELESS COMMUNICATION SYSTEM

(71) Applicant: Samsung Electronics Co., Ltd., Gyeonggi-do (KR)

(72) Inventors: Taehyoung Kim, Seoul (KR); Youngbum Kim, Seoul (KR); Jinyoung Oh, Seoul (KR); Seunghoon Choi, Gyeonggi-do (KR); Heedon Gha, Gyeonggi-do (KR); Taehan Bae, Seoul (KR)

(73) Assignee: Samsung Electronics Co., Ltd

( * ) Notice: Subject to any disclaimer, the term of this patent is extended or adjusted under 35 U.S.C. 154(b) by 0 days.

This patent is subject to a terminal disclaimer.

(21) Appl. No.: 16/727,485

(22) Filed: Dec. 26, 2019

(65) Prior Publication Data

US 2020/0137670 A1 Apr. 30, 2020

Related U.S. Application Data

(63) Continuation of application No. 16/037,524, filed on Jul. 17, 2018, now Pat. No. 10,924,982.

(30) Foreign Application Priority Data

Jul. 17, 2017 (KR) .................. 10-2017-0090220

(51) Int. Cl.
*H04W 48/12* (2009.01)
*H04W 72/04* (2009.01)

(52) U.S. Cl.
CPC ......... *H04W 48/12* (2013.01); *H04W 72/042* (2013.01); *H04W 72/0453* (2013.01)

(58) Field of Classification Search
CPC .............. H04W 48/12; H04W 72/042; H04W 72/0453
See application file for complete search history.

(56) References Cited

U.S. PATENT DOCUMENTS

| 2015/0181577 A1 | 6/2015 | Moulsley |
| 2015/0208387 A1 | 7/2015 | Awad et al. |

(Continued)

FOREIGN PATENT DOCUMENTS

| EP | 3 128 801 | 2/2017 |
| EP | 3 142 283 | 3/2017 |

(Continued)

OTHER PUBLICATIONS

International Search Report dated Oct. 11, 2018 issued in counterpart application No. PCT/KR2018/007901, 3 pages.

(Continued)

*Primary Examiner* — Deepa Belur
(74) *Attorney, Agent, or Firm* — The Farrell Law Firm, P.C.

(57) ABSTRACT

The disclosure relates to a communication method and system for converging a $5^{th}$-Generation (5G) communication system for supporting higher data rates beyond a $4^{th}$-Generation (4G) system with a technology for Internet of Things (IoT). A method of a user equipment is provided. The method includes identifying a first bandwidth part for a cell and a second bandwidth part for the cell through a radio resource control signaling, wherein each of the first bandwidth part and the second bandwidth part is defined with a corresponding subcarrier spacing and frequency domain location; identifying a first control resource set on the first bandwidth part and a second control resource set on the second bandwidth part through the radio resource control signaling; and acquiring second downlink control informa- (Continued)

tion for the second bandwidth part based on the first control resource set on the first bandwidth part being activated.

20 Claims, 8 Drawing Sheets

(56) References Cited

U.S. PATENT DOCUMENTS

| | | |
|---|---|---|
| 2016/0227524 A1 | 8/2016 | Choi et al. |
| 2016/0352551 A1 | 12/2016 | Zhang et al. |
| 2017/0135105 A1 | 5/2017 | Li et al. |
| 2017/0374569 A1 | 12/2017 | Lee et al. |
| 2018/0063865 A1 | 3/2018 | Islam et al. |
| 2018/0152954 A1 | 5/2018 | Golitschek Elder Von Elbwart et al. |
| 2018/0183551 A1* | 6/2018 | Chou ............... H04L 5/001 |
| 2018/0192355 A1 | 7/2018 | Kim et al. |
| 2018/0199343 A1 | 7/2018 | Deogun et al. |
| 2018/0279289 A1 | 9/2018 | Islam et al. |
| 2018/0332605 A1 | 11/2018 | Pelletier |
| 2018/0343154 A1 | 11/2018 | Park et al. |
| 2019/0021045 A1 | 1/2019 | Kim et al. |
| 2019/0036673 A1 | 1/2019 | Chen et al. |
| 2019/0097861 A1* | 3/2019 | Kawasaki ............ H04W 72/02 |
| 2019/0274032 A1 | 9/2019 | Chatterjee et al. |
| 2019/0393992 A1 | 12/2019 | Xiong et al. |
| 2019/0394776 A1 | 12/2019 | Lee et al. |
| 2020/0067676 A1 | 2/2020 | Yi |
| 2020/0077432 A1 | 3/2020 | Xiong et al. |
| 2020/0145882 A1 | 5/2020 | Zhang |
| 2020/0187293 A1 | 6/2020 | Kuang et al. |
| 2020/0229092 A1* | 7/2020 | Wu .................... H04W 76/11 |
| 2020/0229152 A1* | 7/2020 | Park .................... H04L 1/00 |

FOREIGN PATENT DOCUMENTS

| | | | |
|---|---|---|---|
| EP | 3 247 061 | 11/2017 | |
| KR | 20180107686 A | * 10/2018 | ........... H04L 5/0053 |
| WO | WO 2016/114561 | 7/2016 | |

OTHER PUBLICATIONS

Nokia at al., On wider band aspects of NR, R1-1710883, 3GPP TSG-RAN WG1 Meeting NR#2 Qingdao, China, Jun. 27-30, 2017, 6 pages.
Samsung, DL Resource Allocation Aspects, R1-1708017, 3GPP TSG RAN WG1 Meeting #89, Hangzhou, China, May 15-19, 2017, 8 pages.
Huawei et al., Scheduling and resource allocation mechanism for active bandwidth parts, R1-1709974, 3GPP TSG RAN WG1 NR Ad Hoc Meeting.
Qingdao, China, Jun. 27-30, 2017, 7 pages.
Ericsson, On bandwidth parts, R1-1709054, 3GPP TSG-RAN WG1 #89, Hangzhou, China, May 15, 19, 2017, 2 pages.
U.S. Office Action dated Oct. 1, 2019 issued in counterpart U.S. Appl. No. 16/037,524, 32 pages.
European Search Report dated Apr. 20, 2020 issued in counterpart application No. 18834829.6-1212, 9 pages.

* cited by examiner

METHOD AND APPARATUS FOR TRANSMITTING DOWNLINK CONTROL INFORMATION IN WIRELESS COMMUNICATION SYSTEM

CROSS-REFERENCE TO RELATED APPLICATION(S)

This application is a Continuation Application of U.S. patent application Ser. No. 16/037,524, filed on Jul. 17, 2018, and claims priority under 35 U.S.C. § 119(a) to Korean Patent Application Serial Number 10-2017-0090220, filed on Jul. 17, 2017 in the Korean Intellectual Property Office, the entire disclosure of which is incorporated herein by reference.

BACKGROUND

1. Field

The disclosure relates, generally, to a wireless communication system, and more particularly, to a method and apparatus for transmitting downlink control information in a next generation mobile communication system.

2. Description of the Related Art

Efforts have been made to develop an improved 5G or pre-5G communication system, which is also called a "beyond 4G network" or a "post LTE system". The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques have been contemplated for use with the 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency-shift keying (FSK) and quadrature amplitude modulation (QAM) (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been contemplated.

The Internet is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as sensing technology, wired/wireless communication and network infrastructure, service interface technology, and security technology have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

Various attempts have been made to apply 5G communication systems to IoT networks. For example, technologies such as a sensor network, MTC, and M2M communication may be implemented by beamforming, MIMO, and array antennas. Application of a cloud RAN as the above-described Big Data processing technology may also be considered to be as an example of convergence between the 5G technology and the IoT technology.

Meanwhile, there is a need for a method and apparatus for transmitting downlink control information in the next generation mobile communication system in accordance with recent advances in long term evolution (LTE) and LTE-Advanced systems.

SUMMARY

The 5G wireless communication system, unlike existing wireless communication systems, is intended to support not only services requiring high data rates but also services having very short transmission latency and services requiring high connection density. In these scenarios, it is necessary to provide various services involving different transmission and reception techniques and parameters in one system for satisfying diverse requirements and needs of users, and it is important to design the system for forward compatibility so that the services to be added are not constrained by the current system. The 5G wireless communication system is designed to support multiple numerologies for the subcarrier spacing so as to utilize time and frequency resources more flexibly than the existing LTE system.

To achieve ultrahigh speed data services of up to several Gbps in the 5G system, signals can be transmitted and received with an ultra-wide bandwidth of several tens to several hundreds MHz or several GHz. The size of the bandwidth that can be supported by the terminal may be not the same as the size of the system bandwidth. A specific bandwidth part can be configured for the terminal to support signal transmission and reception. According to the relationship that power consumption increases in proportion to the transmission and reception bandwidth, to efficiently manage power consumption of the terminal or the base station through adjustment of the transmission and reception bandwidth, bandwidth parts of different sizes can be configured for the operation of the terminal. To support subcarriers of different sizes, one or many bandwidth parts may be configured for the terminal, and the subcarrier spacing of the individual bandwidth parts may be set differently. The base station may configure bandwidth parts for the terminal, and transmit and receive signals through the corresponding bandwidth part for various purposes. The bandwidth part can be configured via various system parameters.

To schedule data to be sent to the terminal, the base station may determine the bandwidth part to be used and transmit different downlink control information depending upon the configuration information of the corresponding bandwidth part. More specifically, the base station can configure one or more bandwidth parts to the terminal, and can transmit signals using one or more of the configured bandwidth parts. The scheduling information for the data to be transmitted via each bandwidth part may differ according to various system parameters, such as bandwidth size, slot duration and subcarrier spacing, set for the bandwidth part. Consequently, one or more different pieces of downlink control information can be transmitted.

Accordingly, an aspect of the disclosure is to provide a method for transmitting downlink control information for efficient system operation in various signal transmission and reception operations using bandwidth parts. The base station may transmit downlink control information to the terminal for data transmission via the same bandwidth part. The base station may transmit downlink control information to the terminal for data transmission via a different bandwidth part. The base station may transmit downlink control information to the terminal for data transmission via multiple bandwidth parts. To support the operations described above, an additional downlink control information field may be required, or different interpretations of the same downlink control information field may be required. In consideration of this, the disclosure provides a downlink control information field and provides a method and apparatus for transmitting downlink control information correspondingly.

In accordance with an aspect of the disclosure, a method performed by a user equipment is provided for communication in a communication system supporting one or more bandwidth parts. The method includes identifying a first bandwidth part for a cell and a second bandwidth part for the cell through a radio resource control signaling, wherein each of the first bandwidth part and the second bandwidth part is defined with a corresponding subcarrier spacing and frequency domain location; identifying a first control resource set on the first bandwidth part and a second control resource set on the second bandwidth part through the radio resource control signaling; and acquiring second downlink control information for the second bandwidth part based on the first control resource set on the first bandwidth part being activated. A bandwidth part indicator, a frequency domain resource assignment, and a time domain resource assignment are included in the second downlink control information. A number of bits of bandwidth part indicator is defined based on the radio resource control signaling. The first bandwidth part is activated by first downlink control information. The first downlink control information and the second downlink control information are acquired in a user equipment specific control region.

In accordance with another aspect of the disclosure, a user equipment is provided for communication in a communication system supporting one or more bandwidth parts. The user equipment includes a transceiver; and a controller coupled with the transceiver and configured to identify a first bandwidth part for a cell and a second bandwidth part for the cell through a radio resource control signaling, wherein each of the first bandwidth part and the second bandwidth part is defined with a corresponding subcarrier spacing and frequency domain location, identify a first control resource set on the first bandwidth part and a second control resource set on the second bandwidth part through the radio resource control signaling, and acquire second downlink control information for the second bandwidth part based on the first control resource set on the first bandwidth part being activated. A bandwidth part indicator, a frequency domain resource assignment, and a time domain resource assignment are included in the second downlink control information. A number of bits of bandwidth part indicator is defined based on the radio resource control signaling. The first bandwidth part is activated by first downlink control information. The first downlink control information and the second downlink control information are acquired in a user equipment specific control region.

In accordance with another aspect of the disclosure, a method performed by a base station is provided for communication in a communication system supporting one or more bandwidth parts. The method includes transmitting a radio resource control signaling including information for a first bandwidth part for a cell and information for a second bandwidth part for the cell, wherein each of the first bandwidth part and the second bandwidth part is defined with a corresponding subcarrier spacing and frequency domain location; identifying a first control resource set on the first bandwidth part and a second control resource set on the second bandwidth part through the radio resource control signaling; and transmitting second downlink control information for the second bandwidth part based on the first control resource set on the first bandwidth part being activated. A bandwidth part indicator, a frequency domain resource assignment, and a time domain resource assignment are included in the second downlink control information. A number of bits of bandwidth part indicator is defined based on the radio resource control signaling. The first bandwidth part is activated by first downlink control information. The first downlink control information and the second downlink control information are acquired in a user equipment specific control region.

In accordance with another aspect of the disclosure, a base station is provided for communication in a communication system supporting one or more bandwidth parts. The base station includes a transceiver; and a controller coupled with the transceiver and configured to transmit a radio resource control signaling including information for a first bandwidth part for a cell and information for a second bandwidth part for the cell, wherein each of the first bandwidth part and the second bandwidth part is defined with a corresponding subcarrier spacing and frequency domain location, identify a first control resource set on the first bandwidth part and a second control resource set on the second bandwidth part through the radio resource control signaling, and transmit second downlink control information for the second bandwidth part based on the first control resource set on the first bandwidth part being activated. A bandwidth part indicator, a frequency domain resource assignment, and a time domain resource assignment are included in the second downlink control information. A number of bits of bandwidth part indicator is defined based on the radio resource control signaling. The first bandwidth part is activated by first downlink control information. The first downlink control information and the second downlink control information are acquired in a user equipment specific control region.

BRIEF DESCRIPTION OF THE DRAWINGS

The above and other aspects, features and advantages of certain embodiments of the disclosure will be more apparent from the following detailed description taken in conjunction with the accompanying drawings, in which.

DETAILED DESCRIPTION

Figure 1:
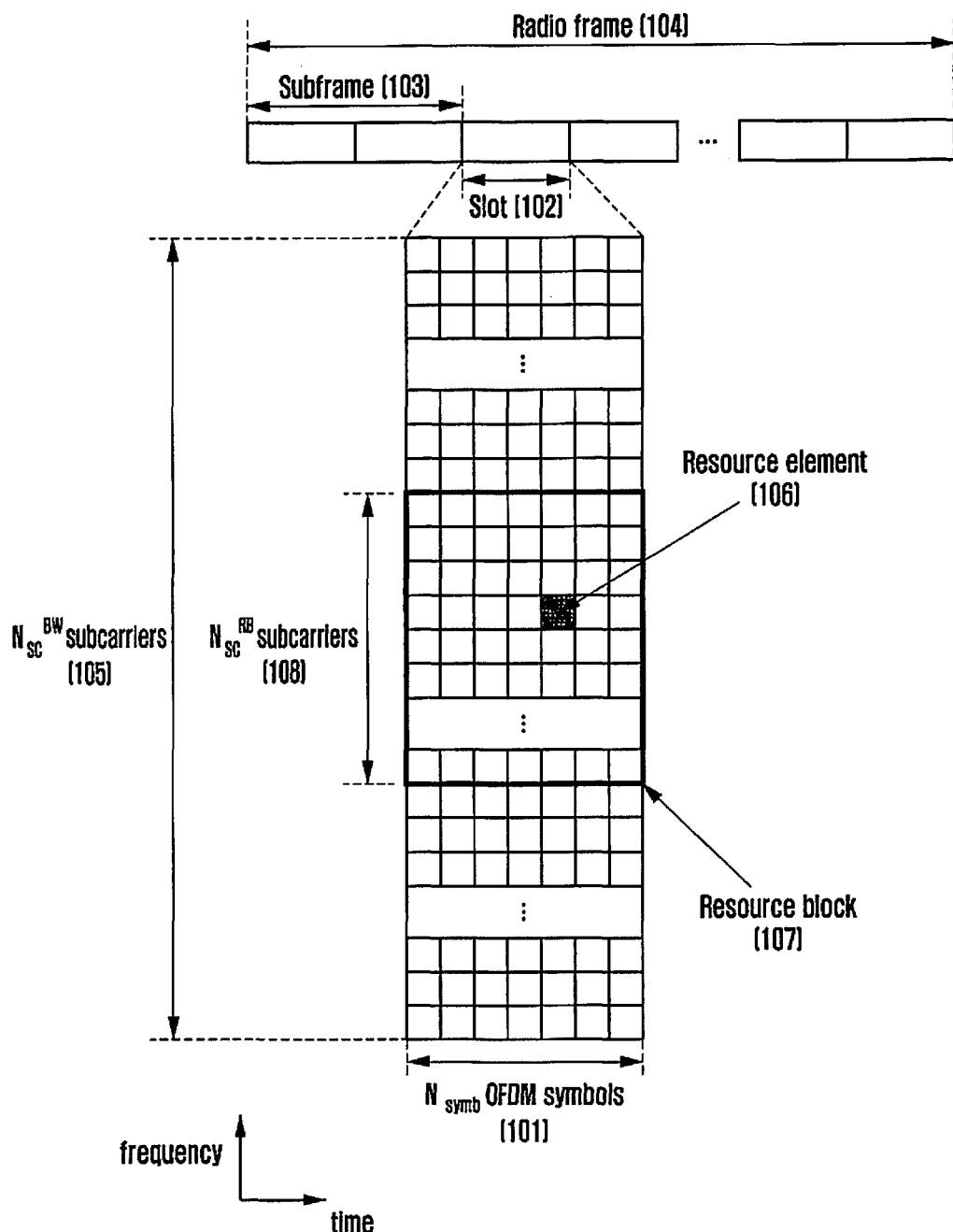
FIG. 1 is a diagram of the time-frequency domain in LTE, according to an embodiment.

Embodiments of the disclosure will be described herein below with reference to the accompanying drawings. However, the embodiments of the disclosure are not limited to the specific embodiments and should be construed as including all modifications, changes, equivalent devices and methods, and/or alternative embodiments of the present disclosure. In the description of the drawings, similar reference numerals are used for similar elements.

The terms "have," "may have," "include," and "may include" as used herein indicate the presence of corresponding features (for example, elements such as numerical values, functions, operations, or parts), and do not preclude the presence of additional features.

The terms "A or B," "at least one of A or/and B," or "one or more of A or/and B" as used herein include all possible combinations of items enumerated with them. For example, "A or B," "at least one of A and B," or "at least one of A or B" means (1) including at least one A, (2) including at least one B, or (3) including both at least one A and at least one B.

The terms such as "first" and "second" as used herein may use corresponding components regardless of importance or an order and are used to distinguish a component from another without limiting the components. These terms may be used for the purpose of distinguishing one element from another element. For example, a first user device and a second user device may indicate different user devices regardless of the order or importance. For example, a first element may be referred to as a second element without departing from the scope the disclosure, and similarly, a second element may be referred to as a first element.

It will be understood that, when an element (for example, a first element) is "(operatively or communicatively) coupled with/to" or "connected to" another element (for example, a second element), the element may be directly coupled with/to another element, and there may be an intervening element (for example, a third element) between the element and another element. To the contrary, it will be understood that, when an element (for example, a first element) is "directly coupled with/to" or "directly connected to" another element (for example, a second element), there is no intervening element (for example, a third element) between the element and another element.

The expression "configured to (or set to)" as used herein may be used interchangeably with "suitable for," "having the capacity to," "designed to," "adapted to," "made to," or "capable of" according to a context. The term "configured to (set to)" does not necessarily mean "specifically designed to" in a hardware level. Instead, the expression "apparatus configured to . . . " may mean that the apparatus is "capable of . . . " along with other devices or parts in a certain context. For example, "a processor configured to (set to) perform A, B, and C" may mean a dedicated processor (e.g., an embedded processor) for performing a corresponding operation, or a generic-purpose processor (e.g., a central processing unit (CPU) or an application processor (AP)) capable of performing a corresponding operation by executing one or more software programs stored in a memory device.

The terms used in describing the various embodiments of the disclosure are for the purpose of describing particular embodiments and are not intended to limit the disclosure. As used herein, the singular forms are intended to include the many forms as well, unless the context clearly indicates otherwise. All of the terms used herein including technical or scientific terms have the same meanings as those generally understood by an ordinary skilled person in the related art unless they are defined otherwise. The terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in this disclosure should not be interpreted as excluding the embodiments of the disclosure.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the disclosure may include at least one of an application-specific integrated circuit (ASIC) chip, a field-programmable gate array (FPGA), and a programmable-logic device for performing operations which has been known or are to be developed hereinafter.

An electronic device according to the disclosure may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a MPEG-1 audio layer-3 (MP3) player, a mobile medical device, a camera, and a wearable device. The wearable device may include at least one of an accessory type (e.g., a watch, a ring, a bracelet, an anklet, a necklace, a glasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit).

The electronic device may be a home appliance. The home appliance may include at least one of, for example, a television, a digital video disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung IomeSync™, Apple TV™, or Google TV™), a game console (e.g., Xbox™ and PlayStation™), an electronic dictionary, an electronic key, a camcorder, and an electronic photo frame.

The electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment device, an electronic device for a ship (e.g., a navigation device for a ship, and a gyro-compass), avionics, security devices, an automotive head unit, a robot for home or industry, an automatic teller machine (ATM) in banks, point of sales (POS) devices in a shop, or an IoT device (e.g., a light bulb, various sensors, electric or gas meter, a sprinkler device, a fire alarm, a thermostat, a streetlamp, a toaster, a sporting goods, a hot water tank, a heater, a boiler, etc.).

The electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device may be a combination of one or more of the aforementioned various devices. The electronic device may also be a flexible device. Further, the electronic device is not limited to the aforementioned devices, and may include an electronic device according to the development of new technology.

Hereinafter, an electronic device will be described with reference to the accompanying drawings. In the disclosure, the term "user" may indicate a person using an electronic device or a device (e.g., an artificial intelligence electronic device) using an electronic device.

The following description is based on LTE and 5G systems. However, it should be understood by those skilled in the art that the subject matter of the disclosure is applicable to other communication systems having similar technical backgrounds and channel configurations without significant modifications departing from the scope of the disclosure.

In contrast to early wireless communication systems having provided voice-oriented services only, advanced broadband wireless communication systems, such as 3GPP high speed packet access (HSPA) systems, LTE or evolved universal terrestrial radio access (E-UTRA) systems, LTE-advanced (LTE-A) systems, LTE Pro systems, 3GPP2 high rate packet data (HRPD) systems, ultra mobile broadband (UMB) systems, and IEEE 802.16e based systems, may provide high-speed and high-quality packet data services.

In the LTE system as a representative example of a wideband wireless communication system, orthogonal frequency division multiplexing (OFDM) is used for the downlink and single carrier frequency division multiple access (SC-FDMA) is used for the uplink. The uplink refers to a radio link through which a terminal (user equipment (UE) or mobile station (MS)) sends a data or control signal to a base station (BS or eNode B), and the downlink refers to a radio link through which a base station sends a data or control signal to a terminal. In such multiple access schemes, time-frequency resources used to carry user data or control information are allocated so as not to overlap each other (i.e. maintain orthogonality) to thereby identify the data or control information of a specific user.

As a post-LTE communication system, the 5G communication system should be able to support services satisfying various requirements in consideration of various needs of users and service providers. The 5G communication system can be designed to support enhanced mobile broadband (eMBB), massive machine type communication (mMTC), and ultra reliable and low latency communications (URLLC).

eMBB provides a higher data rate than that supported by the existing LTE, LTE-A or LTE-Pro system. For eMBB in the 5G communication system, the base station should be able to provide a peak data rate of 20 Gbps in the downlink and a peak data rate of 10 Gbps in the uplink. The 5G communication system provides an increased user perceived data rate for the terminal. Satisfying these requirements requires improvements in various transmission and reception techniques including improved MIMO technology. While the current LTE system transmits signals using a maximum transmission bandwidth of 20 MHz in the 2 GHz band, the 5G communication system may meet the required data transmission rate by using a transmission bandwidth greater than 20 MHz in the bands of frequencies between 3 and 6 GHz or 6 GHz and higher.

In the 5G communication system, mMTC supports application services such as the IoT. For efficient support of IoT services, mMTC is required to support a massive number of terminals in a cell, extend the coverage for the terminal, lengthen the battery time for the terminal, and reduce the cost of the terminal. The IoT must be able to support a massive number of terminals (e.g., 1,000,000 terminals/km$^2$) in a cell to provide a communication service to sensors and components attached to various devices. In addition, due to the nature of the service, mMTC is more likely to cover shadow areas such as the basement of a building and an area that a cell cannot cover, thus requiring a coverage wider than that provided by other 5G services. Low-cost terminals are likely to be used in mMTC, and a very long battery lifetime (e.g., 10 to 15 years) is required because it is difficult to frequently replace the battery of a terminal.

URLLC, as cellular-based mission-critical wireless communication for a specific purpose, is a service usable for remote control of robots or machinery, industrial automation, unmanned aerial vehicles, remote health care, and emergency notification, and should enable ultra-reliable and low-latency communication. A URLLC service may have to support both an air interface latency of less than 0.5 ms and a packet error rate of $10^{-5}$ or less as a requirement. Hence, for URLLC, the transmission time interval (TTI) should be shorter than that of other 5G services, and resources should be allocated in a wide frequency band for the reliability of communication links.

The three 5G services (i.e., eMBB, URLLC, and mMTC) can be multiplexed and transmitted in one system. Here, to satisfy different requirements, different transmission and reception techniques and parameters can be used for the 5G services.

FIG. 1 is a diagram of the time-frequency domain serving as radio resources to transmit data or control channels in the downlink of the LTE system, according to an embodiment.

In FIG. 1, the horizontal axis denotes the time domain and the vertical axis denotes the frequency domain. In the time domain, the minimum unit for transmission is OFDM symbols. $N_{symb}$ OFDM symbols 101 constitute one slot 102, and two slots constitute one subframe 103. The length of a slot is 0.5 ms and the length of a subframe is 1.0 ms. The radio frame (or frame) 104 is a time domain unit composed of 10 subframes. In the frequency domain, the minimum unit for transmission is subcarriers, and the total system transmission bandwidth is composed of a total $N_{BW}$ subcarriers 105. The basic unit of resources in the time-frequency domain is a resource element (RE) 106. The RE may be represented by an OFDM symbol index and a subcarrier index. A resource block (RB, or physical resource block (PRB)) 107 is defined by $N_{symb}$ consecutive OFDM symbols 101 in the time domain and $N_{RB}$ consecutive subcarriers 108 in the frequency domain. Hence, one RB 107 is composed of $N_{symb} \times N_{RB}$ REs 106. The minimum unit for data transmission is an RB. In the LTE system, $N_{symb}$ is set to 7 and $N_{RB}$ is set to 12, and $N_{BW}$ and $N_{RB}$ are proportional to the bandwidth of the system transmission band.

In the LTE system, scheduling information for downlink data or uplink data is sent by the base station to the terminal through downlink control information (DCI). Various DCI formats are defined. The DCI format to be used may be determined according to various parameters related to scheduling information for uplink data, scheduling information for downlink data, compact DCI with a small size, spatial multiplexing using multiple antennas, and power control DCI. For example, DCI format 1 for scheduling information of downlink data is configured to include at least the following pieces of control information.

Resource allocation type 0/1 flag: this indicates whether the resource allocation scheme is type 0 or type 1. Type 0 indicates resource allocation in units of RB groups (RBG) by use of a bitmap. In the LTE system, the basic scheduling unit is an RB represented as a time-frequency domain resource. An RBG including multiple RBs is the basic scheduling unit for type 0. Type 1 indicates allocation of a specific RB in one RBG.

Resource block assignment: this indicates an RB allocated for data transmission. The resource represented by RB assignment is determined according to the system bandwidth and resource allocation scheme.

Modulation and coding scheme (MCS): this indicates the modulation scheme applied for data transmission and the transport block (TB) size for data to be sent.

Hybrid automatic repeat request (HARQ) process number: this indicates the process number of the corresponding HARQ process.

New data indicator: this indicates either initial transmission or retransmission for HARQ.

Redundancy version: this indicates the redundancy version for HARQ.

TPC (transmit power control) command for PUCCH: this indicates a TPC command for the physical uplink control channel (PUCCH) serving as an uplink control channel.

The DCI is channel coded, modulated, and sent through the PDCCH or EPDCCH.

A cyclic redundancy check (CRC) is attached to the DCI message payload, and the CRC is scrambled with a radio network temporary identifier (RNTI) corresponding to the identity of a terminal. Different RNTIs are used depending on the purpose of the DCI message, e.g., terminal-specific data transmission, power control command, or random access response. That is, the RNTI is not explicitly transmitted but is included in the CRC calculation for transmission. Upon receiving a DCI message transmitted on the PDCCH, the terminal uses the allocated RNTI to check the CRC. If the CRC check is successful, the terminal is aware that the DCI message is transmitted to it.

The LTE system supports three types of resource allocation (type 0, type 1, and type 2) for the PDSCH.

In resource allocation type 0, non-consecutive RB allocation in the frequency domain is supported, and a bitmap is used to indicate the allocated RBs. When the allocated RBs are indicated by a bitmap with the same size as the number of RBs, it may be necessary to transmit a very large bitmap as to a large cell bandwidth, resulting in a high control signaling overhead. In resource allocation type 0, the size of the bitmap is reduced by grouping those RBs consecutive in the frequency domain and pointing to the groups without pointing to the individual RBs. When the total transmission bandwidth is $N_{RB}$ and the number of RBs per RBG is P, the bitmap necessary to notify RB allocation information in resource allocation type 0 becomes $\lceil N_{RB}/P \rceil$. If the number of RBs per RBG (i.e., P) is small, scheduling flexibility is increased, but the control signaling overhead is increased. The P value should be selected appropriately so as to reduce the number of bits required while maintaining sufficient resource allocation flexibility. In LTE, the RBG size is determined by the downlink cell bandwidth, and possible RBG sizes are shown in Table 1 below.

TABLE 1

| System Bandwidth $N_{RB}^{DL}$ | RBG Size (P) |
|---|---|
| ≤10 | 1 |
| 11-26 | 2 |
| 27-63 | 3 |
| 64-110 | 4 |

In resource allocation type 1, resource allocation is performed by dividing the entire RBG set into RBG subsets scattered in the frequency domain. The number of subsets is given by the cell bandwidth, and the number of subsets in resource allocation type 1 is equal to the RBG size (P) in resource allocation type 0. The RB allocation information in resource allocation type 1 is composed of three fields described below.

A first field indicating the selected RBG subset ($\lceil \log_2(P) \rceil$ bits).

A second field indicating the shift of resource allocation in the subset (1 bit).

A third field indicating the bitmap for the allocated RBG ($\lceil N_{RB}/P \rceil - \lceil \log_2(P) \rceil - 1$ bits).

As a result, the total number of bits used in resource allocation type 1 becomes $\lceil N_{RB}/P \rceil$, which is equal to the number of bits required in resource allocation type 0. A 1-bit indicator is added to notify the terminal of whether the resource allocation type is 0 or 1.

Resource allocation type 2 does not depend on a bitmap, unlike the two resource allocation types described above. Instead, the resource allocation is indicated by the start point of the RB allocation and length thereof. Resource allocation types 0 and 1 support non-consecutive RB allocation, while resource allocation type 2 supports only sequential RB allocation. As a result, the RB allocation information in resource allocation type 2 is composed of two fields described below.

A first field indicating the RB start point ($RB_{start}$).

A second field indicating the length of consecutively allocated RBs ($L_{CRBs}$).

In resource allocation type 2, total $\lceil \log_2(N_{RB}(N_{RB}+1)/2) \rceil$ bits are used.

All three resource allocation types are related to virtual RB (VRBs). In resource allocation types 0 and 1, the VRBs are mapped directly to the physical resource blocks in a localized form. Resource allocation type 2 supports both localized VRBs and distributed VRBs. In resource allocation type 2, there is an additional indicator to indicating localized or distributed VRBs.

Figure 2:
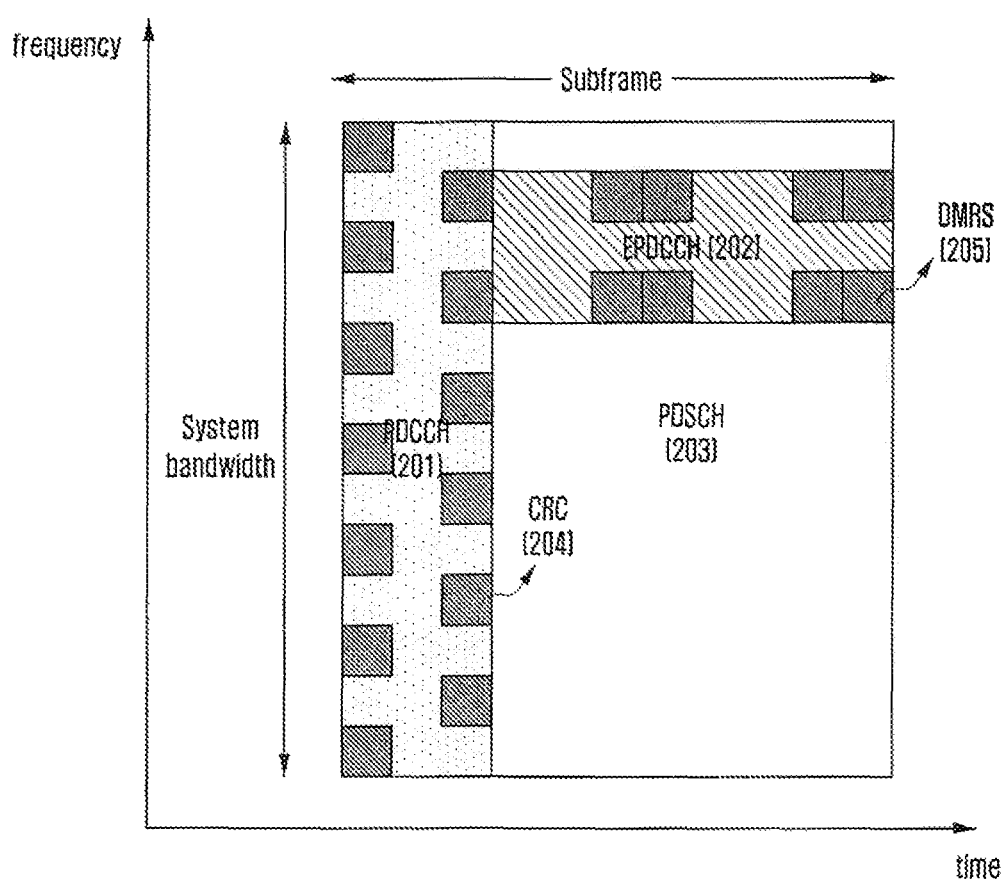
FIG. 2 is a diagram of a physical downlink control channel (PDCCH) and enhanced PDCCH (EPDCCH) serving as a downlink control channel in long term evolution (LTE), according to an embodiment.

FIG. 2 is a diagram of a PDCCH 201 and an enhanced PDCCH (EPDCCH) 202 serving as downlink physical channels through which the DCI is transmitted in LTE, according to an embodiment.

In FIG. 2, the PDCCH 201 is time-multiplexed with the PDSCH 203 serving as a data transmission channel and is transmitted over the overall system bandwidth. The region of the PDCCH 201 is represented by the number of OFDM symbols, and the number of OFDM symbols is notified to the terminal via a control format indicator (CFI) transmitted through the physical control format indicator channel (PCFICH). The PDCCH 201 is allocated to the first OFDM symbols of the subframe so that the terminal can decode the downlink scheduling assignment as soon as possible. This can reduce the decoding delay for the downlink shared channel (DL-SCH), i.e., the overall downlink transmission delay. Since one PDCCH carries one DCI message and a plurality of terminals can be scheduled simultaneously in the downlink and uplink, multiple PDCCHs are simultaneously transmitted in each cell. The CRS (cell specific reference signal) 204 is used as a reference signal for decoding the PDCCH 201. The CRS 204 is transmitted every subframe over the entire bandwidth, and scrambling and resource mapping are changed according to the cell ID (identity). Since the CRS 204 is a reference signal common to all terminals, terminal-specific beamforming cannot be used. In LTE, multiple antenna transmission for the PDCCH is limited to open loop transmit diversity. The number of CRS ports is implicitly notified to the terminal from the decoding of the physical broadcast channel (PBCH).

The resource allocation for the PDCCH 201 is based on a control channel element (CCE), and one CCE is composed of 9 resource element groups (REGs) (i.e., 36 resource elements (REs)). The number of CCEs required for a particular PDCCH 201 may be 1, 2, 4, or 8 depending on the channel coding rate of the DCI message payload. Different numbers of CCEs are used to implement the link adaptation of the PDCCH 201. The terminal should detect a signal in a state where it does not know information about the PDCCH 201. A search space indicating a set of CCEs for blind decoding is specified in LTE. The search space is composed of a set of CCEs for each aggregation level, and is not explicitly signaled but implicitly specified by a function of the terminal identity and the subframe number. The terminal performs decoding of the PDCCH 201 for all possible resource candidates that can be generated from the CCEs in the search space set in each subframe, and processes the information found to be valid to the terminal through the CRC check.

The search space is classified into a terminal-specific search space and a common search space. Some or all terminals in a certain group can examine the common search space of the PDCCH 201 to receive control information common to the cell such as dynamic scheduling of the system information and paging messages. The scheduling assignment information of the DL-SCH for transmission of system information block 1 (SIB-1) including the cell operator information can be received by checking the common search space of the PDCCH 201.

In FIG. 2, the EPDCCH 202 is frequency-multiplexed with the PDSCH 203 for transmission. The base station can appropriately allocate resources for the EPDCCH 202 and the PDSCH 203 through scheduling and effectively support the coexistence with data transmissions for the existing LTE terminal. However, since the EPDCCH 202 is transmitted over one entire subframe in the time domain, there is a loss in terms of transmission delay. A plurality of EPDCCHs 202 constitute one EPDCCH set, and allocation of an EPDCCH set is performed on a PRB pair basis. The location information for the EPDCCH set is terminal-specifically configured and is signaled via RRC (radio resource control). Up to two EPDCCH sets may be configured for a terminal, and one EPDCCH set may be configured for different terminals at the same time in a multiplexed fashion.

The resource allocation of the EPDCCH 202 is based on the ECCE (enhanced CCE), one ECCE can be composed of four or eight enhanced REGs (EREGs), and the number of EREGs per ECCE depends on the cyclic prefix (CP) length and the subframe configuration information. One EREG is composed of 9 REs, and there can be 16 EREGs per PRB pair. EPDCCH transmission may be localized or distributed according to the RE mapping scheme of the EREG. The ECCE aggregation level can be 1, 2, 4, 8, 16, or 32, and is determined according to the CP length, subframe configuration, EPDCCH format, and transmission scheme.

The EPDCCH 202 supports only the terminal-specific search space. Hence, a terminal wishing to receive a system message must examine the common search space on the existing PDCCH 201.

In the EPDCCH 202, a demodulation reference signal (DMRS) 205 is used as a reference signal for decoding. Precoding for the EPDCCH 202 can be configured by the base station and use terminal-specific beamforming. Through the DMRS 205, the terminals can perform decoding on the EPDCCH 202 without knowing what precoding is used. The EPDCCH 202 uses the same pattern as the DMRS of the PDSCH 203. However, unlike the PDSCH 203, the DMRS 205 in the EPDCCH 202 can support transmission using up to four antenna ports. The DMRS 205 is transmitted only in the corresponding PRB in which the EPDCCH is transmitted.

The port configuration information of the DMRS 205 depends on the transmission scheme of the EPDCCH 202. For localized transmission, the antenna port corresponding to the ECCE to which the EPDCCH 202 is mapped is selected based on the ID of the terminal. If different terminals share the same ECCE (i.e., multiuser MIMO transmission is used), the DMRS antenna port can be assigned to each terminal. Alternatively, transmission may be performed by sharing the DMRS 205. It can be distinguished according to the DMRS scrambling sequence which is set by higher layer signaling. For distributed transmission, up to two antenna ports are supported for the DMRS 205, and a diversity scheme of precoder cycling is supported. The DMRS 205 may be shared for all REs transmitted within one PRB pair.

In LTE, the entire PDCCH region is composed of a logical set of CCEs and includes a search space composed of a set of CCEs. The search space may be a common search space or a terminal-specific search space. The search space for the LTE PDCCH is defined as follows.

The set of PDCCH candidates to monitor are defined in terms of search spaces, where a search space $S_k^{(L)}$ at aggregation level $L \in \{1, 2, 4, 8\}$ is defined by a set of PDCCH candidates. For each serving cell on which PDCCH is monitored, the CCEs corresponding to PDCCH candidate m of the search space $S_k^{(L)}$ are given by Equation (1):

$$L\{(Y_k+m')\bmod \lfloor N_{CCE,k}/L \rfloor\}+i \qquad (1)$$

where $Y_k$ is defined below, $i=0, \ldots, L-1$. For the common search space $m'=m$. For the PDCCH UE specific search space, for the serving cell on which PDCCH is monitored, if the monitoring UE is configured with carrier indicator field then $m'=m+M^{(L)} \cdot n_{CI}$ where $n_{CI}$ is the carrier indicator field value, else if the monitoring UE is not configured with carrier indicator field then $m'=m$, where $m=0, \ldots, M^{(L)}-1$. $M^{(L)}$ is the number of PDCCH candidates to monitor in the given search space.

Note that the carrier indicator field value is the same as ServCellIndex

For the common search spaces, $Y_k$ is set to 0 for the two aggregation levels L=4 and L=8.

For the UE-specific search space $S_k^{(L)}$ at aggregation level L, the variable $Y_k$ is defined by Equation (2):

$$Y_k = (A \cdot Y_{k-1}) \bmod D \qquad (2)$$

where $Y_{-1} = n_{RNTI} \neq 0$, A=39827, D=65537 and k=$\lfloor n_s/2 \rfloor$, $n_s$ is the slot number within a radio frame.

The RNTI value used for $n_{RNTI}$ is defined in subclause 7.1 in downlink and subclause 8 in uplink.

According to the definition of the search space for the PDCCH described above, the terminal-specific search space is implicitly defined through a function of the terminal identity and the subframe number without being explicitly signaled. In other words, since the terminal-specific search space can be changed according to the subframe number, the terminal-specific search space can be changed over time, which solves the problem that a specific terminal cannot use the search space due to other terminals (blocking problem). Although a specific terminal cannot be scheduled in a given subframe because all the CCEs are used by other terminals scheduled in the same subframe, since the search space varies with time, such a problem may not occur in the next subframe. For example, although the terminal-specific search space of terminal #1 and the terminal-specific search space of terminal #2 partially overlap in a specific subframe, as the terminal-specific search space changes for each subframe, it can be expected that the overlap in the next subframe will be different.

According to the definition of the search space for the PDCCH described above, the common search space is defined as a set of pre-agreed CCEs because a certain group of terminals or all terminals must receive the PDCCH. The common search space does not vary according to the terminal identity or the subframe number. The common search space is used to transmit various system messages, but it can also be used to transmit control information of a specific terminal. As such, the common search space may be a solution to the problem that the terminal cannot be scheduled due to a lack of available resources in the terminal-specific search space.

The search space at a given aggregation level is a set of candidate control channels composed of CCEs where the terminal should attempt decoding. Since there are several aggregation levels that create one group with 1, 2, 4, and 8 CCEs, the terminal has multiple search spaces. The number of PDCCH candidates to be monitored by the terminal in the search space at a given aggregation level in the LTE PDCCH is defined as shown in Table 2 below.

TABLE 2

| | Search space $S_k^{(L)}$ | | Number of PDCCH |
|---|---|---|---|
| Type | Aggregation level $L$ | Size [in CCEs] | candidates $M^{(L)}$ |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

According to Table 2, for the terminal-specific search space, {1, 2, 4, 8} aggregation levels are supported with {6, 6, 2, 2} PDCCH candidates, respectively. For the common search space, {4, 8} aggregation levels are supported with {4, 2} PDCCH candidates, respectively. The reason that the common search space supports only aggregation levels {4, 8} is to improve the coverage characteristics because system messages generally have to reach the edge of the cell.

The DCI transmitted via the common search space is defined only for some DCI formats such as 0/1A/3/3A/1C, which are used for system messages or power control for terminal groups. The DCI format with spatial multiplexing is not supported in the common search space. The downlink DCI format to be decoded in the terminal-specific search space varies depending on the transmission mode set for the corresponding terminal. Since the transmission mode is set through RRC signaling, the accurate subframe number is not specified as to whether the setting is effective for the terminal. The terminal can operate so as not to lose the communication by always decoding DCI format 1A regardless of the transmission mode.

A description has been given above of transmitting the downlink control channel and the search space in the existing LTE or LTE-A system.

Next, a description is given of the downlink control channel in the 5G communication system.

Figure 3:
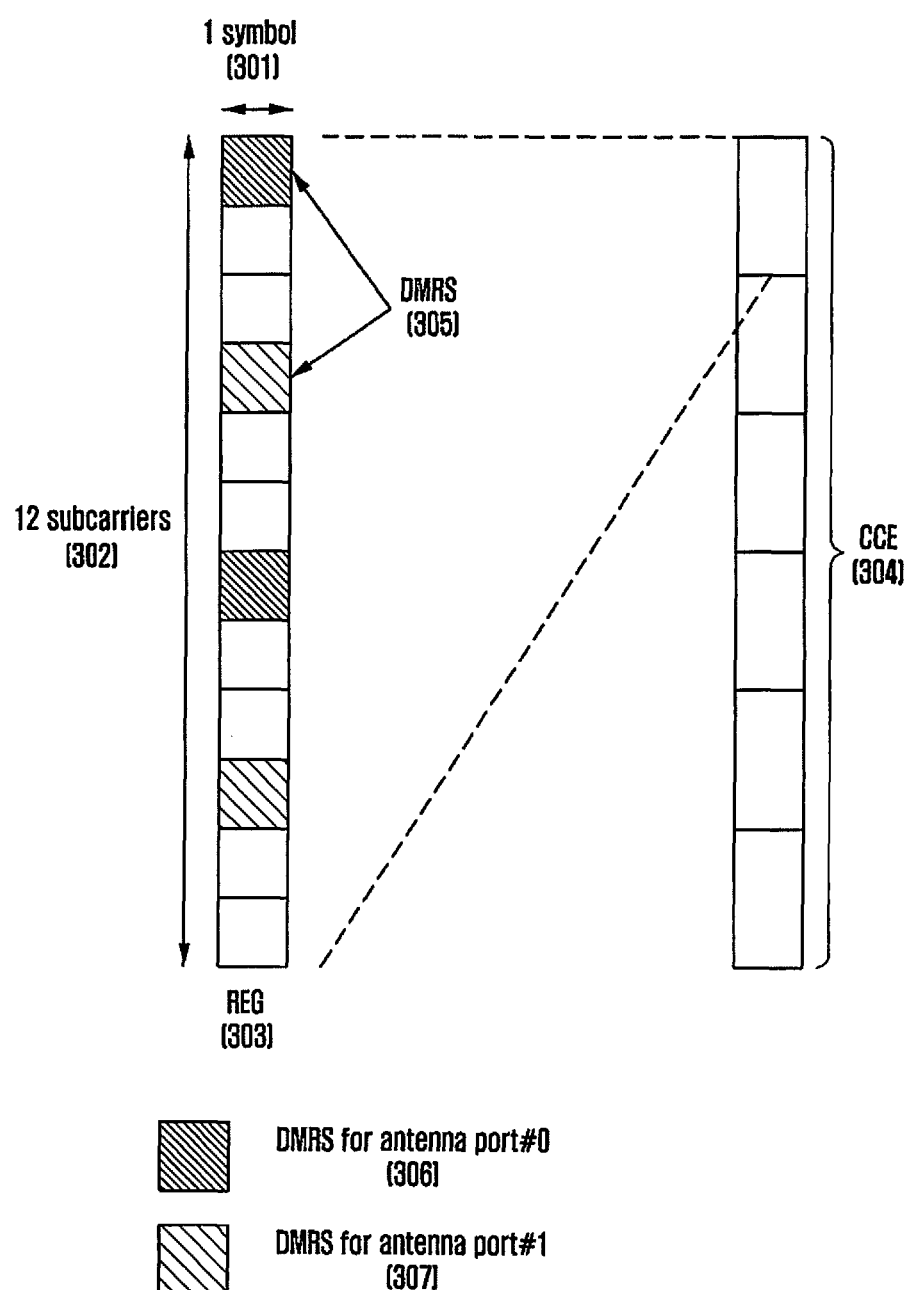
FIG. 3 is a diagram of the 5G downlink control channel, according to an embodiment.

FIG. 3 is a diagram of time-frequency resources constituting a downlink control channel usable in a 5G communication system, according to an embodiment. In FIG. 3, the basic unit (REG 303, or new radio (NR) REG (NR-REG 303)) of the time-frequency resources constituting the control channel is composed of one OFDM symbol 301 in the time domain and 12 subcarriers 302 (i.e., 1 RB) in the frequency domain. In the basic unit of the control channel, by assuming that the time-domain unit is one OFDM symbol 301, the data channel and the control channel can be time-multiplexed within one subframe. By placing the control channel ahead of the data channel, the processing time of the user can be reduced, facilitating satisfaction of the latency requirement. By setting the frequency-domain unit of the control channel to 1 RB (302), frequency multiplexing between the control channel and the data channel can be performed more efficiently.

By concatenating the NR-REGs 303 shown in FIG. 3, control channel regions of various sizes can be configured. When the basic unit for allocation of the downlink control channel in the 5G system is a NR-CCE 304, one NR-CCE 304 may be composed of many NR-REGs 303. The NR-REG 303 shown in FIG. 3 may be composed of 12 REs, and if one NR-CCE 304 is composed of 4 NR-REGs 303, one NR-CCE 304 may be composed of 48 REs. When a downlink control region is configured, the downlink control region may be composed of many NR-CCEs 304, and a specific downlink control channel may be mapped to one NR-CCE 304 or many NR-CCEs 304 in the control region for transmission according to the aggregation level. The NR-CCEs 304 in the control region are identified by their numbers, and the numbers can be assigned according to the logical mapping scheme.

The basic unit of the downlink control channel shown in FIG. 3 (i.e., NR-REG 303) may include the REs to which the DCI is mapped and a region to which the DMRS 305 serving as a reference signal for decoding the DCI is mapped. The DMRS 305 can be efficiently transmitted in consideration of the overhead due to the RS assignment. When the downlink control channel is mapped for transmission to a plurality of OFDM symbols, the DMRS 305 may be mapped for transmission only to the first OFDM symbol. The DMRS 305 may be mapped in consideration of the number of antenna ports used to transmit the downlink control channel. In FIG. 3, two antenna ports are used, but the disclosure is not so limited. There may be a DMRS 306 transmitted for antenna port #0 and a DMRS 307 transmitted for antenna port #1. The DMRSs for different antenna ports can be multiplexed in various ways. In FIG. 3, DMRSs corresponding to different antenna ports are orthogonally transmitted via different REs. The DMRSs can be frequency division multiplexed (FDMed) or code division multiplexed (CDMed) for transmission. There may be various other DMRS patterns in association with the number of antenna ports. In the following description of the embodiments, it is assumed that two antenna ports are used. The same principle may be applied to the cases where two or more antenna ports are used.

Figure 4:
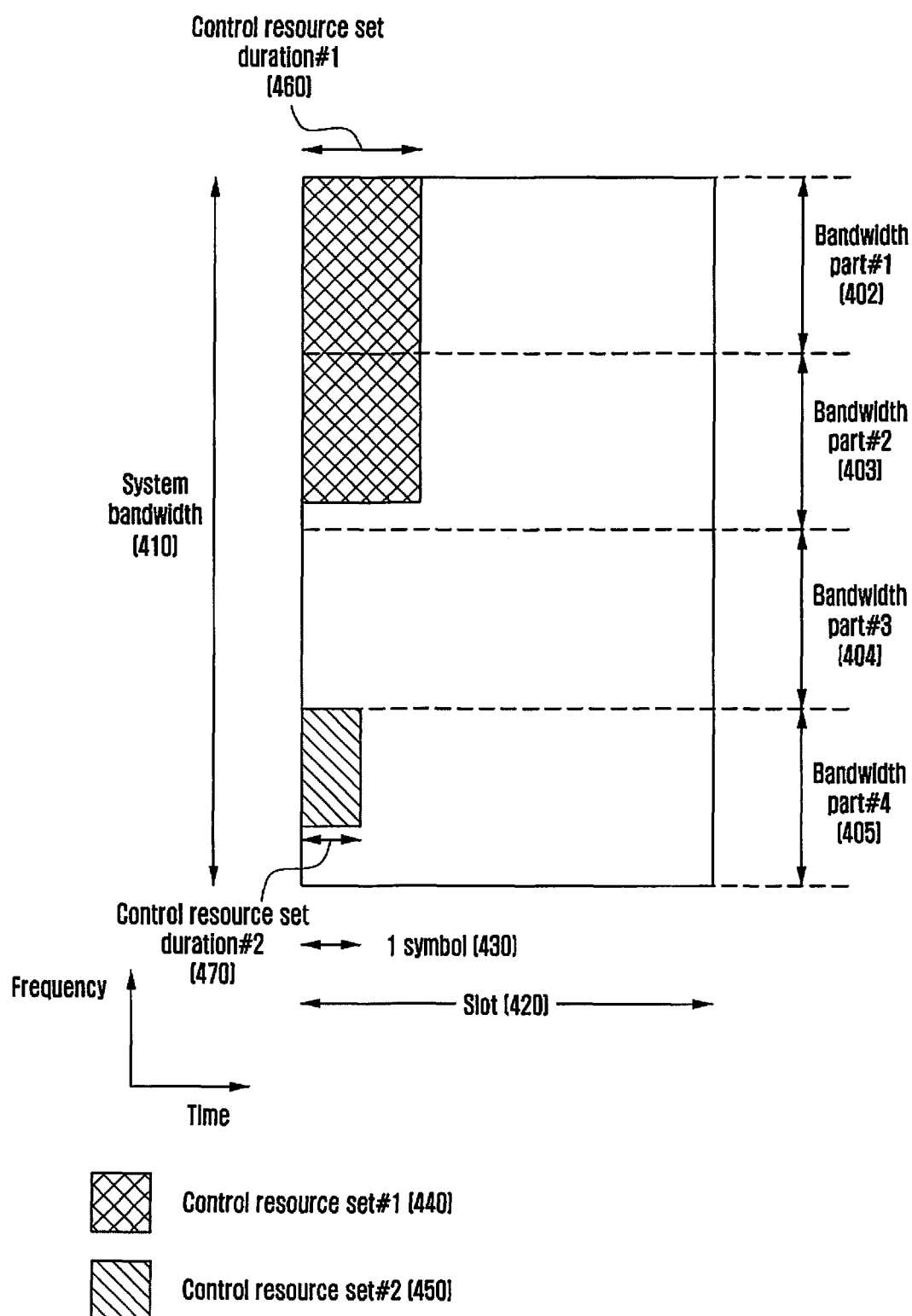
FIG. 4 is a diagram of a resource region allocation for the 5G downlink control channel, according to an embodiment.

FIG. 4 is a diagram of a control region (control resource set (CORESET)) in which the downlink control channel is transmitted in the 5G wireless communication system, according to an embodiment.

In FIG. 4, there are the system bandwidth 410 in the frequency domain and one slot 420 in the time domain (one slot is assumed to include 7 OFDM symbols). The overall system bandwidth 410 may be composed of multiple bandwidth parts (e.g., 4 four bandwidth parts in FIG. 4 including bandwidth part #1 (402), bandwidth part #2 (403), bandwidth part #3 (404), and bandwidth part #4 (405)).

In FIG. 4, two control regions (control region #1 (440) and control region #2 (450)) are configured. In the frequency domain, the control regions 440 and 450 may be set over specific sub-bands within the overall system bandwidth 410.

Control region #1 (440) is configured over bandwidth part #1 (402) and bandwidth part #2 (403), and control region #2 (450) is configured within bandwidth part #4 (405). In the time domain, the control region may include one or many OFDM symbols, and the number of such OFDM symbols may be referred to as the control region length (control resource set duration 460 or 470). In FIG. 4, control region #1 (440) is configured to have control region length #1 of 2 symbols, and control region #2 (470) is configured to have control region length #2 of 1 symbol.

In the 5G communication system, a plurality of control regions can be configured in one system from the base station perspective. Also, a plurality of control regions can be configured for one terminal from the terminal perspective. Some of the control regions configured in the system can be set for the terminal. Consequently, the terminal may be unaware of a specific control region existing in the system. In FIG. 4, two control regions (control region #1 (440) and control region #2 (450)) are configured in the system, and control region #1 (440) can be assigned to terminal #1 and control region #1 (440) and control region #2 (450) can be assigned to terminal #2. If there is no additional indicator, terminal #1 may be unaware of the existence of control region #2 (450).

The control region in the above-described 5G system may be configured as a common control region, terminal-group common control region, or terminal-specific control region. The control region may be configured for a terminal through terminal-specific signaling, terminal-group common signaling, or RRC signaling. Configuring the control region for the terminal means providing information related to the location of the control region, the sub-band, resource allocation of the control region, and the control region length. The base station may provide the following information.

TABLE 3

Configuration information 1. Frequency domain RB allocation information
Configuration information 2. Time domain control region length (number of symbols assigned to control region, start symbol)
Configuration information 3. Resource mapping scheme (time-first mapping, frequency-first mapping)

TABLE 3-continued

Configuration information 4. Transmission mode (interleaved transmission mode, non-interleaved transmission mode)
Configuration information 5. Search space type (common search space, group-common search space, terminal-specific search space)
Configuration information 6. Monitoring occasion (monitoring period/interval, monitoring symbol location in slot)
Configuration information 7. DMRS configuration information (DMRS configuration, number of DMRS ports)
Configuration information 8. REG bundling size In addition to the above configuration information, other information necessary for transmitting the downlink control channel may be configured for the terminal.

In the 5G communication system, it is necessary to flexibly define and operate the frame structure in consideration of various services and requirements. For example, individual services may have different subcarrier spacings depending on their requirements. Currently, two schemes are being considered to support a plurality of subcarriers in the 5G communication system. As a first scheme for supporting a plurality of subcarriers in the 5G communication system, a set of subcarrier spacings that the 5G communication system can have may be determined using Equation (3) below.

$$\Delta f = f_0 2^m \quad (3)$$

Here, $f_0$ represents the basic subcarrier spacing of the system, and m represents an integer scaling factor. If $f_0$ is 15 kHz, the set of subcarrier spacings that the 5G communication system can have may include 7.5 KHz, 15 KHz, 30 KHz, 60 KHz, 120 KHz, and the like. The system can be configured by using all or some elements of the subcarrier spacing set given by Equation (3). It is assumed that a subcarrier spacing set {15 KHz, 30 KHz, 60 KHz} with $f_0$=15 kHz is used in the 5G communication system according to the scheme described above. However, the technique proposed herein can be applied without limitation to the case with a different subcarrier spacing set (e.g., {17.5 KHz, 35 KHz, 70 KHz} with $f_0$=17.5 KHz). If a subcarrier spacing set {17.5 KHz, 35 KHz, 70 KHz} is considered, this subcarrier spacing set may be mapped with respect to the description based on $f_0$=15 kHz. Likewise, a subcarrier spacing set based on 35 kHz, 70 kHz, or 140 kHz may be mapped to another subcarrier spacing set based on 30 kHz, 60 kHz, or 120 kHz, respectively.

Figure 5:
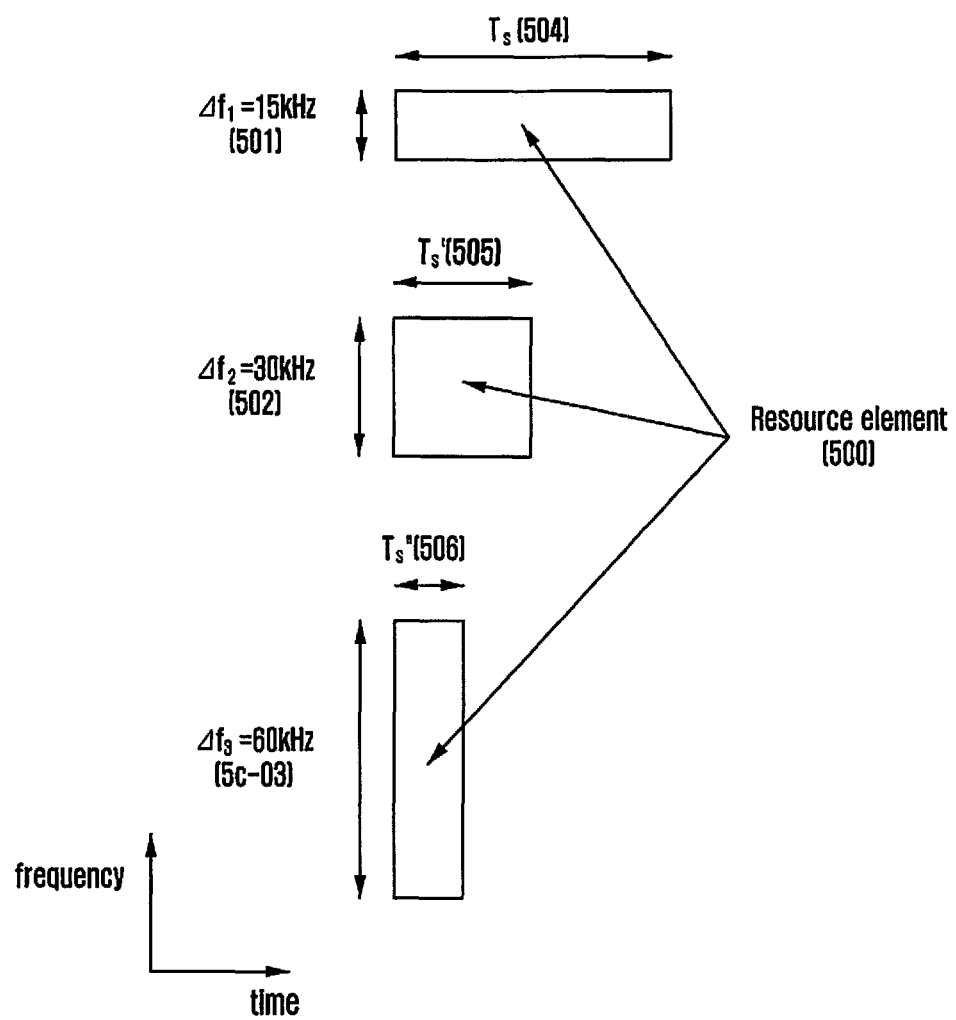
FIG. 5 is a diagram of many subcarrier spacings considered in 5G communication, according to an embodiment.

FIG. 5 shows resource elements 500 for subcarrier spacings $\Delta f_1$ (601), $\Delta f_2$ (502), $\Delta f_3$ (503), respectively. The subcarrier spacings $\Delta f_1$ (501), $\Delta f_2$ (502) and $\Delta f_3$ (503) correspond respectively to 15 kHz, 30 kHz and 60 kHz. Each resource element has an OFDM symbol length of $T_s$ (504), $T_s'$ (505), or $T_s''$ (506). As characteristics of OFDM symbols, the subcarrier spacing and the OFDM symbol length have a reciprocal relationship, and it can be confirmed that the symbol length shortens when the subcarrier spacing increases. That is, the value of $T_s$ (504) is twice the value of $T_s'$ (505) and is four times the value of $T_s''$ (506).

Figure 6:
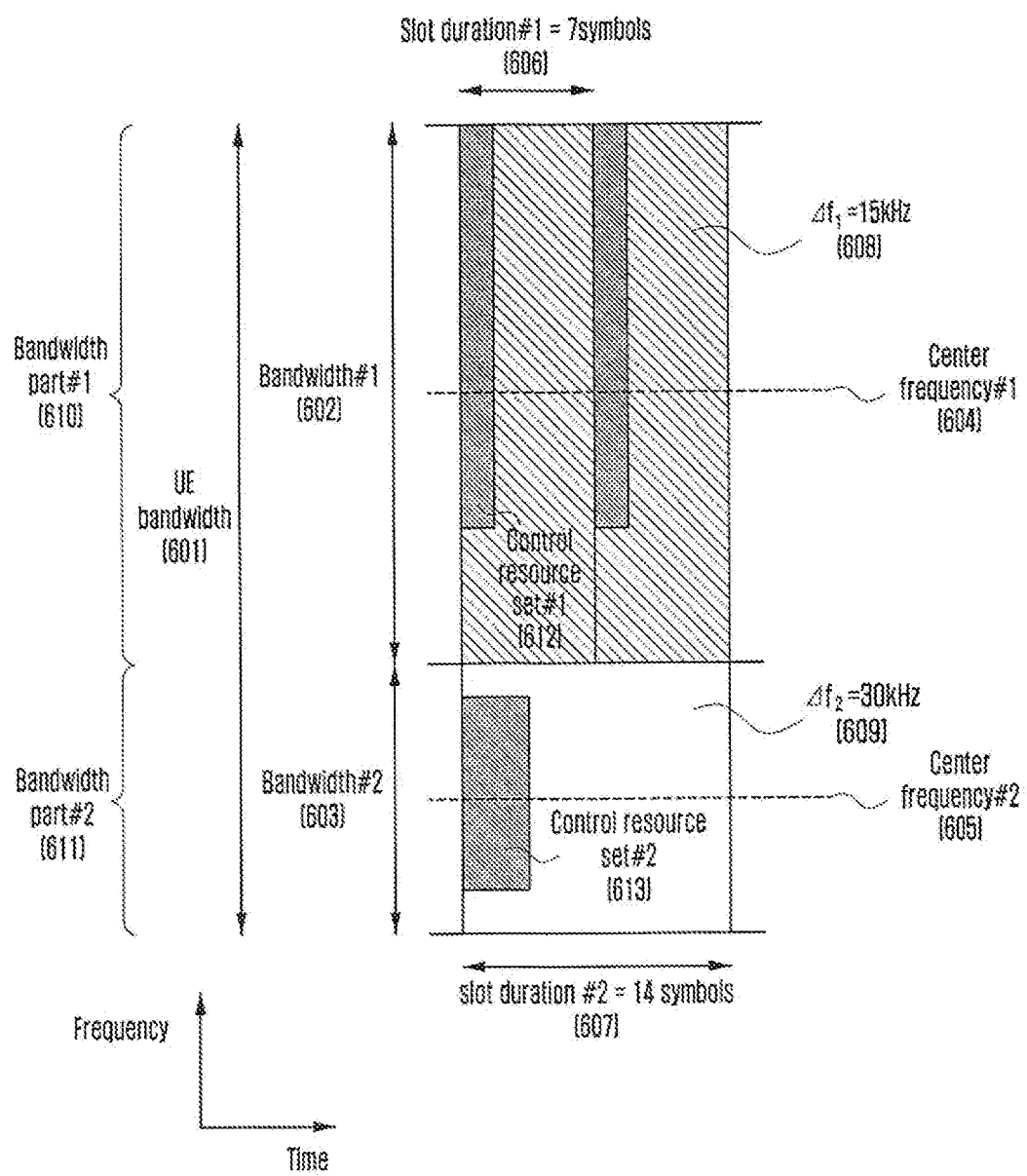
FIG. 6 is a diagram of bandwidth parts considered in 5G communication, according to an embodiment.

FIG. 6 is a diagram of bandwidth parts considered in 5G communication, according to an embodiment.

The base station can configure one or more bandwidth parts for the terminal. In FIG. 6, two bandwidth parts (i.e., bandwidth part #1 (610) and bandwidth part #2 (611)) are configured in the terminal bandwidth 601.

The base station can specify the location and bandwidth size of each bandwidth part for the terminal. In FIG. 6, bandwidth part #1 (610) is located at center frequency #1 (604) and has a bandwidth size of bandwidth #1 (602), and bandwidth part #2 (611) is located at center frequency #2 (605) and has a bandwidth size of bandwidth #2 (603). The location of a bandwidth part can be set in various ways, e.g., by notifying the offset of a reference point within the terminal bandwidth or system bandwidth. The size of a bandwidth part can be set in various ways, e.g., by notifying the number of RBs present in the bandwidth part.

The base station can set the numerology (e.g., subcarrier spacing) of each bandwidth part for the terminal. In FIG. 6, the subcarrier spacing of bandwidth part #1 (610) is set to $\Delta f_1$ (=15 kHz, 608) and the subcarrier spacing of bandwidth part #2 (611) is set to $\Delta f_2$ (=30 kHz, 609). The slot duration of a bandwidth part can be changed according to the subcarrier spacing. The slot duration may be varied not only by the subcarrier spacing but also by the number of OFDM symbols constituting the slot. One slot may be composed of 7 OFDM symbols or 14 OFDM symbols. The base station can set information on the slot duration of each bandwidth part (i.e., information on the number of OFDM symbols constituting the slot (7 OFDM symbols or 14 OFDM symbols)). Bandwidth part #1 (610) is configured to have slot duration #1 (=7 OFDM symbols, 606), and bandwidth part #2 (611) is configured to have slot duration #2 (=14 OFDM symbols, 607).

The base station can configure a control region (control resource set) for the downlink control channel to transmit and receive the DCI for each bandwidth part of the terminal. The base station may configure control region #1 (612) as the control region for transmitting the DCI for bandwidth part #1 (610), and configure control region #2 (613) as the control region for transmitting the DCI for bandwidth part #2 (611). To receive the DCI for a specific bandwidth part, the terminal can examine the corresponding control region set in the bandwidth part. To configure a control region for a bandwidth part, the base station may notify the terminal of all or some of the system parameters listed in Table 3, for example.

The base station may transmit the terminal configuration information for the bandwidth part through higher layer signaling (e.g., RRC signaling).

As described before, to achieve ultrahigh speed data services of up to several Gbps in the 5G system, signals can be transmitted and received with an ultra-wide bandwidth of several tens to several hundreds MHz or several GHz. The size of the bandwidth that can be supported by the terminal may be not the same as the size of the system bandwidth. A specific bandwidth part can be configured for the terminal to support signal transmission and reception.

To schedule data to be transmitted to the terminal, the base station may determine the bandwidth part to be used for transmission and transmit different DCIs according to the configuration information of the bandwidth part. More specifically, the base station can configure one or more bandwidth parts for the terminal and can transmit signals by using one or more of the configured bandwidth parts. The scheduling information for data to be transmitted via each bandwidth part may be different according to various system parameters set for the bandwidth part, such as bandwidth size, slot duration and subcarrier spacing. Hence, one or more different DCIs can be transmitted.

In accordance with the disclosure, a DCI transmission method for efficient system operation in various signal transmission and reception operations using bandwidth parts can be provided. The base station may transmit the DCI to the terminal for data transmission via the same bandwidth part. The base station may transmit the DCI to the terminal for data transmission via a different bandwidth part. The base station may transmit the DCI to the terminal for data transmission via multiple bandwidth parts. To support the operations described above, an additional DCI field may be required, or different interpretations of the same DCI field may be required.

Embodiment 1

The first embodiment of the disclosure provides a method and apparatus for transmitting and receiving the DCI.

The base station may configure one or more bandwidth parts for the terminal. Each bandwidth part may be configured with different system parameters such as subcarrier spacing, bandwidth size, RBG size, and slot duration.

The base station may transmit the terminal an indicator for activating or deactivating one or more of the configured bandwidth parts, and the base station and the terminal can transmit and receive signals via the activated bandwidth part. This indicator may be notified by the base station to the terminal through higher layer signaling (e.g., RRC signaling or medium access control (MAC) control element (CE) signaling) or L1 signaling (e.g., common DCI, group-common DCI, or terminal-specific DCI).

The base station can configure a control region (control resource set) for the downlink control channel in each bandwidth part configured for the terminal, and can transmit the DCI for the bandwidth part via the corresponding control region.

More specifically with reference to FIG. 6, the base station can configure bandwidth part #1 (602) and bandwidth part #2 (603) for the terminal, and can configure control region #1 (612) and control region #2 (613) for bandwidth part #1 (602) and bandwidth part #2 (603), respectively. The base station may transmit the DCI for bandwidth part #1 (602) via control region #1 (612) and transmit the DCI for bandwidth part #2 (603) via control region #2 (613).

The terminal may receive configuration information for one or more bandwidth parts from the base station. The terminal may receive configuration information for the control region associated with each bandwidth part from the base station. The terminal may receive an indicator for activating or deactivating one or more of the configured bandwidth parts from the base station. The terminal can receive the DCI for the corresponding bandwidth part via the control regions associated with one or more activated bandwidth parts.

Embodiment 2

The second embodiment of the disclosure provides a method and apparatus for transmitting and receiving the DCI.

The base station may configure one or more bandwidth parts for the terminal.

The base station may transmit to the terminal an indicator for activating or deactivating one or more of the configured bandwidth parts, and the base station and the terminal can transmit and receive signals via the activated bandwidth part.

The base station can configure a control region (control resource set) for the downlink control channel in each bandwidth part configured for the terminal, and can transmit the DCI for the bandwidth part via the corresponding control region.

The base station may also transmit the DCI for one or more different bandwidth parts via the control region of one or more activated bandwidth parts. The base station may configure the terminal with information regarding the bandwidth part whose control region is to be used to transmit the DCI for another bandwidth part through higher layer signaling such as RRC or MAC CE signaling.

The terminal may receive configuration information for one or more bandwidth parts from the base station. The terminal may receive configuration information for the control region associated with each bandwidth part from the base station. The terminal may receive configuration information regarding the control region of a specific bandwidth part to be used to receive the DCI for another bandwidth part. The terminal may receive an indicator for activating or deactivating one or more of the configured bandwidth parts from the base station. The terminal can receive the DCI for the corresponding bandwidth part or another bandwidth part via the control region associated with one or more activated bandwidth parts.

More specifically with reference to FIG. 6, the base station can configure the terminal with bandwidth part #1 (602) and bandwidth part #2 (603), and can configure control region #1 (612) and control region #2 (613) for bandwidth part #1 (602) and bandwidth part #2 (603), respectively.

The base station may configure the terminal with configuration information indicating that the DCI for bandwidth part #1 (602) is transmitted via control region #1 (612) and the DCI for bandwidth part #2 (603) is transmitted via control region #2 (613), and may perform DCI transmission according to the configuration information. Based on the configuration information from the base station, the terminal may monitor control region #1 (612) to receive the DCI for bandwidth part #1 (602), and monitor control region #2 (613) to receive the DCI for bandwidth part #2 (603).

The base station may also configure the terminal with configuration information indicating that the DCI for bandwidth part #1 (602) and bandwidth part #2 (603) is transmitted via control region #1 (612), and may perform DCI transmission according to the configuration information. Based on the configuration information from the base station, the terminal may monitor control region #1 (612) to receive the DCI for bandwidth part #1 (602) and the DCI for bandwidth part #2 (603).

The base station may also configure the terminal with configuration information indicating that the DCI for bandwidth part #1 (602) and bandwidth part #2 (603) is transmitted via control region #2 (613), and may perform DCI transmission according to the configuration information. Based on the configuration information from the base station, the terminal may monitor control region #2 (613) to receive the DCI for bandwidth part #1 (602) and the DCI for bandwidth part #2 (603).

The following terms will be defined for ease of description of the embodiments of the disclosure.

Self scheduling: indicates that the DCI indicating data scheduling and the scheduled data are transmitted via the same bandwidth part. The base station can transmit the data and corresponding DCI by using the same bandwidth part, and the terminal can obtain data scheduling information for a specific bandwidth part from the DCI transmitted via the same bandwidth part.

Cross scheduling: indicates that the DCI indicating data scheduling and the scheduled data are transmitted via different bandwidth parts. The base station can transmit the data and corresponding DCI by using different bandwidth parts, and the terminal can obtain data scheduling information for a specific bandwidth part from the DCI transmitted via another bandwidth part.

Self bandwidth-part scheduling or cross bandwidth-part scheduling can be configured by the base station for the terminal via higher layer signaling such as RRC signaling.

Embodiment 3

The third embodiment of the disclosure provides a DCI design scheme for reducing the number of blind decodings of the terminal when the control region of a specific bandwidth part is used to transmit not only the corresponding DCI but also the DCI for another bandwidth part.

As described in the second embodiment, the base station may notify the terminal of whether a specific bandwidth part is self-scheduled or cross-scheduled.

For example, in FIG. 6, the base station may specify configuration information indicating that DCI #1 containing scheduling information for bandwidth part #1 (602) and DCI #2 containing scheduling information for bandwidth part #2 (603) are both transmitted via control region #1 (612) of bandwidth part #1 (602). Self-scheduling is performed for bandwidth part #1 (602) and cross-scheduling is performed for bandwidth part #2 (603).

Since bandwidth part #1 (602) and bandwidth part #2 (603) can be set by different system parameters, the DCIs (DCI #1 and DCI #2) for individual bandwidth parts may have different sizes.

Different bandwidth parts can have bandwidths of different sizes and different subcarrier spacings, and thus can have different numbers of RBs or RBGs of different sizes. The DCI for each bandwidth part may contain data scheduling information for the corresponding bandwidth part (frequency-domain resource allocation information (i.e., RB allocation)). For different bandwidth parts set by different parameters (bandwidth, subcarrier spacing, number of RBs, and RBG size), the number of bits required for RB allocation may differ and thus the overall DCI sizes may differ.

Different bandwidth parts may have different subcarrier spacings and different numbers of OFDM symbols per slot, and thus may have different slot durations. The DCI for each bandwidth part may contain data scheduling information for the corresponding bandwidth part (i.e., time-domain resource allocation information).

The time-domain resource allocation information may be represented by the first OFDM symbol index (start point) at which data transmission starts, the last OFDM symbol index (end point) at which data transmission ends, the total number of OFDM symbols used for data transmission (data length), the slot index at which data transmission is performed, or the total number of slots used for data transmission, or a combination thereof. For different bandwidth parts set by different parameters affecting time-domain resource allocation, such as different subcarrier spacings, different numbers of OFDM symbols per slot, and different slot durations, the number of bits required for time-domain resource allocation for data may differ and thus the overall DCI sizes may differ.

Therefore, when the terminal examines control region #1 (612) to detect DCI #1 and DCI #2, since the terminal should perform blind decoding by assuming the sizes of DCI #1 and DCI #2, the number of blind decodings can be increased.

In the third embodiment of the disclosure, the DCIs for different bandwidth parts are set to be equal in size. The terminal does not have to perform additional blind decoding owing to different DCI sizes. It is possible for the terminal to decrease the number of blind decodings, effectively reducing power consumption.

Embodiment 3-1

The sizes of the DCIs for the bandwidth parts can be made equal to the largest DCI size. Here, zero bits (bits padded with zeros) can be appended to the DCI of a small size so as to make it have the same size as the DCI of a relatively large size.

More specifically, and with reference to FIG. 6, when the size of DCI #1 for bandwidth part #1 (602) is M bits and the size of DCI #2 for bandwidth part #2 (603) is N bits, if M is greater than N, (M−N) zero bits may be appended to DCI #2 so as to make DCI #2 have the same size as DCI #1.

To transmit DCI #1, the base station can directly transmit DCI #1 of M bits to the terminal. To transmit DCI #2, the base station can generate DCI #2 of N bits, pad DCI #2 with (M−N) zero bits, and transmit DCI #2 of M bits to the terminal.

When the terminal monitors control region #1 (612) for DCI #1 and DCI #2, it can perform blind decoding by assuming that the DCI size is M bits (i.e., the size of DCI #1 with a larger size). Upon obtaining DCI #1 after blind decoding, the terminal can directly receive it as control information. Upon obtaining DCI #2 after blind decoding, the terminal can extract valid information of N bits from DCI #2 on the assumption that (M−N) zero bits are padded.

Embodiment 3-2

The base station can specify the size of the DCI to be monitored by the terminal in the control region. This information may be sent by the base station to the terminal via higher layer signaling such as RRC signaling or MAC CE signaling. If the actual DCI size and the specified DCI size are different, the DCI size may be adjusted in different ways. For example, if the actual DCI size is less than the specified DCI size, zero bits can be appended to the corresponding DCI to make it have the specified DCI size before transmission. If the actual DCI size is greater than the specified DCI size, some bits of the corresponding DCI may be not transmitted. It is possible not to transmit some of the bits indicating frequency-domain resource allocation (DCI shortening or DCI truncation). When M bits are used as a bitmap indicator for frequency-domain resource allocation, and if it is necessary to shorten the DCI by N bits according to the specified DCI size, only (M−N) bits can be used for the field for resource allocation. DCI shortening can be performed in various other ways.

The terminal can perform blind decoding in the configured control region by assuming the DCI size notified from the base station.

More specifically, and with reference to FIG. 6, it is assumed that the size of DCI #1 for bandwidth part #1 (602) is M bits, the size of DCI #2 for bandwidth part #2 (603) is N bits, and the base station sets the size of the DCI to be monitored to L bits. The values of M, N and L may be equal to or different from each other. If L>M, (L−M) zero bits may be appended to DCI #1 to make it have a size of L bits before transmission. If L<N, one or more fields of DCI #2 may be shortened to make it have a size of L bits before transmission. The field of the DCI to be shortened and the amount of bits to be dropped can be specified in advance or set via higher layer signaling.

Embodiment 3-3

Specific fields of different DCIs for different bandwidth parts may be designed to have the same size. Among the fields in the DCI, the time-domain resource allocation indicator and the frequency-domain resource allocation indicator may have different sizes according to the configuration information of the corresponding bandwidth part.

Embodiment 3-3-1

In different DCIs for different bandwidth parts, the fields for the time-domain resource allocation information can be made to have the same size. More specifically, the following schemes can be applied.

Scheme 1

To make the time-domain resource allocation fields of the DCIs for different bandwidth parts have the same size, the sizes of the time-domain resource allocation fields can be made equal to the larger field size. When the size of the time-domain resource allocation field in DCI #1 for bandwidth part #1 is M bits and the size of the time-domain resource allocation field in DCI #2 for bandwidth part #2 is N bits, and if M>N, the size of the time-domain resource allocation field of DCI #2 can be assumed to be N, and (M−N) zero bits can be appended to the time-domain resource allocation field of DCI #2.

Scheme 2

To make the time-domain resource allocation fields of the DCIs for different bandwidth parts have the same size, the sizes of the time-domain resource allocation fields can be made equal to the smaller field size. When the size of the time-domain resource allocation field in DCI #1 for bandwidth part #1 is M bits and the size of the time-domain resource allocation field in DCI #2 for bandwidth part #2 is N bits, and if M>N, the size of the time-domain resource allocation field of DCI #1 can be assumed to be M. The time-domain resource allocation field of DCI #2 without size change can be interpreted in the conventional way.

The time-domain resource allocation field of DCI #1 whose size is reduced from M bits to N bits can be interpreted differently from the conventional one. For example, assume that the slot duration of bandwidth part #1 is 14 OFDM symbols, then DCI #1 can indicate the start point of the corresponding data with 4 bits, and assume that the slot duration of bandwidth part #2 is 7 OFDM symbols, then DCI #2 can indicate the start point of the corresponding data with 3 bits. The time-domain resource allocation field of DCI #1 can be assumed to be 3 bits, and the data start point corresponding to 14 symbols can be remapped via a 3-bit indicator. For example, the 3-bit indicator may be used to indicate the even-numbered indexes {2, 4, 6, 8, 10, 12, 14} or the odd-numbered indexes {1, 3, 5, 7, 9, 11} among the 14 symbol indexes.

How to interpret the time-domain resource allocation as to the changed DCI field can be specified in advance through system parameters. Alternatively, the base station can redefine information on the mapping between the corresponding indicator and the time-domain resource allocation and notify it to the terminal via higher layer signaling.

For different DCIs having the same size, the terminal may identify the bandwidth part associated with a particular DCI, and may interpret the same DCI information differently. When the DCI obtained through blind decoding is associated with bandwidth part #1, a first analysis scheme (i.e., mapping between the DCI indicator and the time-domain resource allocation information) can be applied to the time-domain resource allocation field of the DCI, and when the DCI obtained through blind decoding is associated with bandwidth part #2, a second analysis scheme (i.e., mapping between the DCI indicator and the time-domain resource allocation information) can be applied to the time-domain resource allocation field of the DCI. How to interpret the time-domain resource allocation as to the DCI with a changed field (i.e., configuration information about first and second analysis schemes) can be specified in advance through system parameters or be notified by the base station to the terminal via configuration information.

Embodiment 3-3-2

In different DCIs for different bandwidth parts, the fields for the frequency-domain resource allocation information can be made to have the same size. More specifically, the following schemes can be applied.

Scheme 1

For different bandwidth parts, if the sizes of the bandwidth parts are the same and the subcarrier spacings are different, the DCI fields for the frequency-domain resource allocation information can be made to have the same size by scaling the RBG size according to the subcarrier spacing. More specifically, assume that for bandwidth part #1, the subcarrier spacing is $\Delta f1$ and the RBG size is M, then for bandwidth part #2, the subcarrier spacing is $\Delta f2$ and the RGB size is N. If $\Delta f2 = \Delta f1 * 2^n$, scaling may be performed according to $N = M/2^n$. For example, assume that both bandwidth part #1 and bandwidth part #2 have a bandwidth size of 10 MHz, bandwidth part #1 has a subcarrier spacing of 15 kHz, and bandwidth part #2 has a subcarrier spacing of 30 kHz, then, the number of RBs for bandwidth part #1 may be twice as many as that for bandwidth part #2. When the RBG size for bandwidth part #1 is M, the RBG size for bandwidth part #2 may be set to M/2, thereby making the number of bits required for the frequency-domain resource allocation for bandwidth part #1 equal to the number of bits required for the frequency-domain resource allocation for bandwidth part #2.

When performing data scheduling for each bandwidth part, the base station can assume the RBG size given by scheme 1 described above, and can determine frequency-domain resource allocation information of the corresponding DCI according to the assumed RBG size. The terminal can obtain the DCI information for each bandwidth part by assuming the RBG size given by scheme 1 described above.

Scheme 2

If different bandwidth parts have the same number of RBs, the same RBG size can be assumed. If both bandwidth part #1 and bandwidth part #2 are composed of M RBs, it can be assumed that the RBG size is N for bandwidth part #1 and bandwidth part #2.

When performing data scheduling for each bandwidth part, the base station can assume the RBG size given by scheme 2 described above, and can determine frequency-domain resource allocation information of the corresponding DCI according to the assumed RBG size. The terminal can obtain the DCI information for each bandwidth part by assuming the RBG size given by scheme 2 described above.

Scheme 3

To make the time-domain resource allocation fields of the DCIs for different bandwidth parts have the same size, the base station can notify the terminal of the RBG size for each bandwidth part. This may be achieved via higher layer signaling such as RRC signaling or MAC CE signaling. For each bandwidth part, the terminal can determine the size of the field for the frequency-domain resource allocation information in the DCI according to the RBG size notified by the base station, can determine the overall DCI size, and can obtain the corresponding DCI through blind decoding.

Scheme 4

To make the time-domain resource allocation fields of the DCIs for different bandwidth parts have the same size, the sizes of the frequency-domain resource allocation fields can be made equal to the larger field size. More specifically, when the size of the frequency-domain resource allocation field in DCI #1 for bandwidth part #1 is M bits and the size of the frequency-domain resource allocation field in DCI #2 for bandwidth part #2 is N bits, and if M>N, the size of the frequency-domain resource allocation field of DCI #2 can be assumed to be N, and (M−N) zero bits can be appended to the frequency-domain resource allocation field of DCI #2.

For each bandwidth part, the base station can determine the size of the frequency-domain resource allocation field in the DCI by using scheme 4 described above. For each bandwidth part, the terminal can assume the size of the frequency-domain resource allocation field in the DCI given by scheme 4 described above and perform blind decoding on the DCI.

Scheme 5

To make the time-domain resource allocation fields of the DCIs for different bandwidth parts have the same size, the sizes of the frequency-domain resource allocation fields can be made equal to the smaller field size. More specifically, when the size of the frequency-domain resource allocation field in DCI #1 for bandwidth part #1 is M bits and the size of the frequency-domain resource allocation field in DCI #2 for bandwidth part #2 is N bits, and if M>N, the size of the frequency-domain resource allocation field of DCI #1 can be assumed to be M.

The frequency-domain resource allocation field of DCI #2 without size change can be interpreted in the conventional way. The frequency-domain resource allocation field of DCI #1 whose size is reduced from M bits to N bits can be interpreted differently from the conventional one. How to interpret the frequency-domain resource allocation as to the changed DCI field can be specified in advance through system parameters. Alternatively, the base station can redefine information on the mapping between the corresponding indicator and the frequency-domain resource allocation and notify it to the terminal via higher layer signaling.

For different DCIs having the same size, the terminal may identify the bandwidth part associated with a particular DCI, and may interpret the same DCI information differently. When the DCI obtained through blind decoding is associated with bandwidth part #1, a first analysis scheme (i.e., mapping between the DCI indicator and the frequency-domain resource allocation information) can be applied to the frequency-domain resource allocation field of the DCI, and when the DCI obtained through blind decoding is associated with bandwidth part #2, a second analysis scheme (i.e., mapping between the DCI indicator and the frequency-domain resource allocation information) can be applied to the frequency-domain resource allocation field of the DCI. How to interpret the frequency-domain resource allocation as to the DCI with a changed field (i.e., configuration information about first and second analysis schemes) can be specified in advance through system parameters or be notified by the base station to the terminal via configuration information.

Embodiment 3-3-3

In the DCIs for different bandwidth parts, it is possible to make the fields corresponding to the overall resource allocation information have the same overall size (i.e., the sum of the sizes of the time-domain resource allocation field and the frequency-domain resource allocation field). More specifically, for bandwidth part #1, assume that the size of the time-domain resource allocation field of is M1 bits and the size of the frequency-domain resource allocation field is N1 bits, and for bandwidth part #2, assume that the size of the time-domain resource allocation field of is M2 bits and the size of the frequency-domain resource allocation field is N2 bits. The sizes of the above fields may be adjusted so as to satisfy Equation (4) below.

$$M1+N1=M2+N2 \qquad (4)$$

The overall size of the fields corresponding to the overall resource allocation information may be specified in advance, may be determined based on the larger field size for a specific bandwidth part, or may be determined based on the smaller field size for a specific bandwidth part. The size information may be notified by the base station to the terminal via higher layer signaling such as RRC signaling or MAC CE signaling.

For each bandwidth part, the terminal may assume the overall size of the resource allocation fields determined based on the above scheme and obtain the corresponding DCI.

Embodiment 4

In the fourth embodiment of the disclosure, an additional field is provided in the DCI exchanged between the base station and the terminal.

The base station and the terminal can transmit and receive data by using one or more carriers (or, component carriers). For each carrier, one or more bandwidth parts may be configured to enable the base station and the terminal to transmit and receive data. The base station may notify the terminal of information on the carrier to be used for data transmission and reception via higher layer signaling (e.g., RRC signaling or MAC CE signaling). The base station may also notify the terminal of the configuration information about the bandwidth part in each carrier via higher layer signaling (e.g., RRC signaling or MAC CE signaling). The base station and the terminal can transmit and receive data through a bandwidth part configured on the carrier.

The DCI for a specific carrier may be transmitted or received via the same carrier (self-scheduling) or via another carrier (cross-scheduling). The base station may notify the terminal of the configuration for the carrier via which the DCI for a specific carrier is to be transmitted through higher layer signaling (e.g., RRC signaling or MAC CE signaling).

As described above, the base station and the terminal can transmit and receive data through one or more carriers. The base station and the terminal can transmit and receive data through one or more bandwidth parts of each carrier. In the fourth embodiment, the DCI exchanged between the base station and the terminal may further include the following fields.

Alternative 1

Carrier indicator: indicates the carrier to which the received DCI corresponds and may be composed of N bits. This can be used to notify the terminal of one of up to $2^N$ carrier indexes.

Bandwidth part indicator: indicates the bandwidth part to which the received DCI corresponds and may be composed of M bits. This can be used to notify the terminal of one of up to $2^M$ bandwidth part indexes.

With respect to Alternative 1 described above, the value of N corresponding to the number of carrier indicator bits may be fixed as a system parameter. Alternatively, the base station may determine the value of N as the number of bits used for the carrier indicator. The base station may notify the terminal of the value of N through higher layer signaling (e.g., RRC signaling or MAC CE signaling).

With respect to Alternative 1 described above, the carrier indicated by the carrier indicator can be specified in advance. More specifically, assume that there are C carriers and N bits that are used as the carrier indicator, then the base station can select $2^N$ carriers from among the C carriers and map the selected $2^N$ carriers using an indicator of N bits. For example, assume that there are C (e.g., 8) carriers {C1, C2, C3, C4, C5, C6, C7, C8} and N (=2) bits that are used as the carrier indicator, then, the base station can select $2^N$ (=4) carriers (e.g., {C1, C2, C4, C7}) from among the 8 carriers and map the selected four carriers using the carrier indicator value {00, 01, 10, 11}. Table 4 illustrates this mapping.

TABLE 4

| Carrier indicator | Carrier index |
|---|---|
| 00 | C1 |
| 01 | C2 |
| 10 | C4 |
| 11 | C7 |

If $C<2^N$, some of the $2^N$ carrier indicator values may be reserved. For example, assume that there are C (e.g., 3) carriers {C1, C2, C3} and N (=2) bits that are used as the carrier indicator, then, the base station may reserve one of the four carrier indicator values. The mapping can be performed as shown in Table 5.

TABLE 5

| Carrier indicator | Carrier index |
|---|---|
| 00 | C1 |
| 01 | C2 |
| 10 | C3 |
| 11 | reserved |

The base station may notify the terminal of the above information (index of the carrier to be used and corresponding carrier indicator) through higher layer signaling (e.g., RRC signaling).

The terminal can receive configuration information about the carrier indicator from the base station, interpret the received carrier indicator according to the configuration information, and determine the carrier to which the received DCI corresponds.

With respect to Alternative 1 described above, the value of M corresponding to the number of bandwidth part indicator bits may be fixed as a system parameter. Alternatively, the base station may determine the value of M as the number of bits used for the bandwidth part indicator. The base station may notify the terminal of the value of M through higher layer signaling (e.g., RRC signaling or MAC CE signaling).

The value of M may be set differently for each carrier. For example, when there are C carriers, $B_i${i=1, 2, . . . , C} bandwidth parts may be configured for the $i^{th}$ carrier. For the $i^{th}$ carrier, the base station may set $M_i$ {i=1, 2, . . . , C} as the number of bits for the bandwidth part indicator.

The base station may also set the same number of bits for the bandwidth part indicator for all carriers. When there are C carriers, $B_i$ {i=1, 2, . . . , C} bandwidth parts may be configured for the $i^{th}$ carrier. The base station may set the value of M as the number of bits for the bandwidth part indicator for each carrier regardless of the values of $B_i$. If $B_i$ is less than $2^M$, some of the $2^M$ bits may be unused (reserved).

To realize Alternative 1 described above, the bandwidth part indicated by the bandwidth part indicator can be specified in advance. More specifically, assume that there are B bandwidth parts and M bits are used as the bandwidth part indicator, then, the base station can select $2^M$ bandwidth parts from among the B bandwidth parts and map the selected $2^M$ bandwidth parts using an indicator of M bits. For example, assume that there are B (e.g., 4) bandwidth parts {BWP1, BWP2, BWP3, BWP4} and M (=1) bits that are used as the bandwidth part indicator, then, the base station can select $2^M$ (=2) bandwidth parts (e.g., {BWP1, BWP3}) from among the 4 bandwidth parts and map the selected two bandwidth parts using the bandwidth part indicator value {0, 1}. Table 6 illustrates this mapping.

TABLE 6

| Bandwidth part indicator | Bandwidth part index |
| --- | --- |
| 0 | BWP1 |
| 1 | BWP2 |

If $B<2^M$, some of the $2^M$ bandwidth part indicator values may be unused (reserved). For example, assume that there is B (=1) bandwidth part {BWP1} and M (=1) bit is used as the bandwidth part indicator, then, the base station may reserve one of the two bandwidth part indicator values. Here, the mapping can be performed as shown in Table 7.

TABLE 7

| Bandwidth part indicator | Bandwidth part index |
| --- | --- |
| 0 | BWP1 |
| 1 | reserved |

The base station may notify the terminal of the above information (index of the bandwidth part for each carrier and corresponding bandwidth part indicator) through higher layer signaling (e.g., RRC signaling).

The terminal can receive configuration information about the bandwidth part indicator from the base station, interpret the received bandwidth part indicator according to the configuration information, and determine the bandwidth part to which the received DCI corresponds.

The terminal can use the DCI fields described in Alternative 1 to identify the bandwidth part of a given carrier corresponding to the DCI. The terminal can identify the carrier corresponding to the DCI based on the carrier indicator and determine the bandwidth part of the identified carrier based on the bandwidth part indicator. The terminal can transmit and receive data via the bandwidth part of the carrier corresponding to the obtained carrier index and bandwidth part index.

Alternative 2

Carrier and bandwidth part indicator (CBPI): indicates the bandwidth part of a specific carrier to which the received DCI corresponds and may be composed of L bits. This can be used to notify the terminal of one of up to $2^L$ indexes corresponding to the combinations of the carrier index and the bandwidth part index.

With respect to Alternative 2 described above, the value of L corresponding to the number of CBPI bits may be fixed as a system parameter. Alternatively, the base station may determine the value of L as the number of bits used for the CBPI. The base station may notify the terminal of the value of L through higher layer signaling (e.g., RRC signaling or MAC CE signaling).

With respect to Alternative 2 described above, the carrier and the bandwidth part thereof indicated by the CBPI can be specified in advance. More specifically, assume that there are C carriers and there are $B_i$ (i=1, 2, . . . , C) bandwidth parts in each carrier, then, there can be $A=\Sigma_{i=1}^{C}B_i$ carrier-bandwidth part combinations. The base station may determine the value of L as the number of CBPI bits. The base station can select 2L CBP indexes (index to a bandwidth part in a specific carrier) and map the selected CBP indexes using an indicator of L bits, and notify this configuration information to the terminal.

For example, assume that there are C (e.g., 4) carriers {C1, C2, C3, C4}, and assume that there are two bandwidth parts {BWP11, BWP12} in carrier C1, there are two bandwidth parts {BWP21, BWP22} in carrier C2, there are two bandwidth parts {BWP31, BWP32} in carrier C3, and there are two bandwidth parts {BWP41, BWP42} in carrier C4, then, there can be A (e.g., 8) carrier-bandwidth part combinations. CBP indexes can be formed by combinations of carrier index Cx and bandwidth part index BWPxy. Table 8 illustrates this mapping.

TABLE 8

| CBP index | Carrier index | Bandwidth part index in each carrier |
| --- | --- | --- |
| CBP1 | C1 | BWP1 |
| CBP2 | C1 | BWP2 |
| CBP3 | C2 | BWP1 |
| CBP4 | C2 | BWP2 |
| CBP5 | C3 | BWP1 |
| CBP6 | C3 | BWP2 |
| CBP7 | C4 | BWP1 |
| CBP8 | C4 | BWP2 |

The base station can set L (=2) bits for the CBPI size. The base station can select $2^L$ (e.g., 4) CBP indexes from among the 8 CBP indexes and map them using the CBPI. The base station may select {CBP1, CBP2, CBP5, CBP8} from among the 8 CBP indexes and map them using CBPI {00, 01, 10, 11}. This can be summarized in Table 9.

TABLE 9

| CBPI | CBP index |
| --- | --- |
| 00 | CBP1 |
| 01 | CBP2 |
| 10 | CBP5 |
| 11 | CBP8 |

If $A<2^L$, some of the $2^L$ carrier indicator values may be unused (reserved). For example, assume that there are A (e.g., 3) CBP indexes {CBP1, CBP2, CBP3} and L (=2) bits that are used as the CBP indicator, then, the base station may reserve one of the four CBP indicator values. Here, the mapping can be performed as shown in Table 10.

TABLE 10

| CBP indicator | CBP index |
| --- | --- |
| 00 | CBP1 |
| 01 | CBP2 |
| 10 | CBP3 |
| 11 | reserved |

As described above, the base station can notify the terminal of configuration information about the mapping between the CBP indicator and the CBP index. The base station can also notify the terminal of configuration information about the carrier and the bandwidth part thereof indicated by each CBP index. The base station may notify the terminal of the above information through higher layer signaling such as RRC signaling or MAC CE signaling.

The terminal can receive configuration information about the CBP indicator and the CBP index from the base station, interpret the received CBP indicator according to the configuration information, and determine the bandwidth part of the carrier to which the received DCI corresponds. The terminal can transmit and receive data via the bandwidth part of the carrier corresponding to the obtained carrier and bandwidth part index.

Embodiment 5

The fifth embodiment of the disclosure provides a method of configuring a search space for the downlink control channel.

The search space of the 5G downlink control channel can be defined as a set of indexes of CCEs shown in FIG. 3 according to the aggregation level. The search space according to the fifth embodiment can be given by Equation (5).

$$f(Y_k, \text{CCE index}, AL, \text{number of PDCCH candidates}, \text{carrier index}, \text{bandwidth part index}) \quad (5)$$

where f(x) represents a function with x as input.

According to Equation (5), the search space can be determined based on the $Y_k$ value, which is a specific value applicable in the $k^{th}$ slot or subframe. The initial value $Y_{-1}$ may be determined by the terminal ID or a specific fixed value. The $Y_{-1}$ value for the terminal-specific search space can be determined according to the terminal ID, and the $Y_{-1}$ value for the common search space can be determined according to a specific value commonly known to all terminals.

According to Equation (5), the search space can be determined based on the CCE index and the aggregation level. The CCE index to be searched by the terminal can be calculated using a relationship (e.g., modulo operation) between the CCE index and the terminal ID (or fixed value). Also, the CCE index settable for each aggregation level can be calculated through a relationship between the CCE index and the aggregation level value. It is also possible to define a set of CCE indexes to be aggregated based on the aggregation level value.

According to Equation (5), the search space can be determined based on the number of PDCCH candidates. The number of PDCCH candidates may be different for each aggregation level value. The search space at each aggregation level value can be defined as a set of CCEs corresponding to the number of NR-PDCCH candidates at the aggregation level value.

According to Equation (5), the search space can be determined based on the carrier index. For example, an offset value applicable to a set of CCE indexes constituting a given search space can be computed in consideration of the carrier index. The $Y_k$ value corresponds to the lowest CCE index constituting the PDCCH candidates at a given aggregation level in the $k^{th}$ slot or subframe, and the offset value can be applied to the lowest CCE index in consideration of the carrier index. This can be represented by Equation (6).

$$\text{Search space}=f(Y_k(\text{carrier index}), \text{CCE index}, AL, \text{number of PDCCH candidates}) \quad (6)$$

where $Y_k$(carrier index) may be represented by Equation (7).

$$Y_k(\text{carrier index})=Y_k+m'=Y_k+m+M(L)*n_{CI} \quad (7)$$

In Equation (7), the value of m may range between 0 and $M^{(L)}-1$ and $M^{(L)}$ is the number of PDCCH candidates at aggregation level L. Here, $n_{CI}$ is a carrier index. When the terminal is configured to monitor the carrier index, the carrier index value obtained from the DCI may be applied. When the terminal is configured not to monitor the carrier index, the value of $n_{CI}$ may be set to 0.

According to Equation (5), the search space can be determined based on the bandwidth part index. For example, an offset value applicable to a set of CCE indexes constituting a given search space can be computed in consideration of the bandwidth part index. The $Y_k$ value corresponds to the lowest CCE index constituting the PDCCH candidates at a given aggregation level in the $k^{th}$ slot or subframe, and the offset value can be applied to the lowest CCE index in consideration of the bandwidth part index. This can be represented by Equation (8).

$$\text{Search space}=f(Y_k(\text{bandwidth part index}), \text{CCE index}, AL, \text{number of PDCCH candidates}) \quad (8)$$

where $Y_k$(bandwidth part index) may be represented by the Equation (9).

$$Y_k(\text{bandwidth part index})=Y_k+m'=Y_k+m+M(L)*n_{BPI} \quad (9)$$

where the value of m may range between 0 and $M^{(L)}-1$ and $M^{(L)}$ is the number of PDCCH candidates at aggregation level L. Here, $n_{BPI}$ is a bandwidth part index. When the terminal is configured to monitor the bandwidth part index, the bandwidth part index value obtained from the DCI may be applied. When the terminal is configured not to monitor the bandwidth part index, the value of $n_{BPI}$ may be set to 0.

According to Equation (5), the search space can be determined in consideration of both the carrier index and the bandwidth part index. For example, an offset value applicable to a set of CCE indexes constituting a given search space can be computed in consideration of the carrier index and the bandwidth part index. This can be represented by Equation (10).

$$\text{Search space}=f(Y_k(\text{carrier index}, \text{bandwidth part index}), \text{CCE index}, AL, \text{number of PDCCH candidates}) \quad (10)$$

where $Y_k$ can be represented by Equation (11).

$$Y_k(\text{carrier index}, \text{bandwidth part index})=Y_k+m'=Y_k+m+f(\text{carrier index}, \text{bandwidth part index}) \quad (11)$$

In Equation (11), f($Y_k$(carrier index, bandwidth part index) is a specific function that takes the carrier index and the bandwidth part index as input. This can be represented by Equation (12).

$$f(\text{carrier index}, \text{bandwidth part index})=M(L)*(n_{CI}+n_{BPI}) \quad (12)$$

Here, $n_{CI}$ is a carrier index and $n_{BPI}$ is a bandwidth part index. When the terminal is configured to monitor the carrier index and the bandwidth part index, the carrier index value and the bandwidth part index value obtained from the DCI may be applied. When the terminal is configured not to monitor the carrier index or the bandwidth part index, the corresponding value of $n_{CI}$ or $n_{BPI}$ may be set to 0.

The search space according to the fifth embodiment can be represented by Equation (13).

$$\text{Search space}=f(Y_k, \text{CCE index}, AL, \text{number of PDCCH candidates}, \text{CBP index}) \quad (13)$$

According to Equation (13), the search space can be determined based on the CBP index. The CBP index (defined in the fourth embodiment of the disclosure) is an index value mapped to a combination of the carrier index and the bandwidth part index of the corresponding carrier. To compute the search space, an offset value applicable to a set of CCE indexes constituting a given search space can be computed in consideration of the CBP index. This can be represented by Equation (14).

$$\text{Search space} = f(Y_k(\text{CBP index}), \text{CCE index}, AL, \text{number of PDCCH candidates}) \quad (14)$$

where $Y_k(\text{CBP index})$ may be represented by Equation (15).

$$Y_k(\text{CBP index}) = Y_k + m' = Y_k + m + M(L) * n_{CBPI} \quad (15)$$

where the value of m may range between 0 and $M^{(L)}-1$ and $M^{(L)}$ is the number of PDCCH candidates at aggregation level L. Here, $n_{CBPI}$ is a CBP index. When the terminal is configured to monitor the CBP index, the CBP index value obtained from the DCI may be applied. When the terminal is configured not to monitor the CBP index, the value of $n_{CBPI}$ may be set to 0.

Next, a description is given of operations of the base station and the terminal according to the fifth embodiment of the disclosure.

The base station can determine the search space for a terminal in consideration of the carrier index or the bandwidth part index. To transmit or receive data for a terminal via a specific bandwidth part of a given carrier, the base station can transmit the DCI of the terminal to the search space calculated based on the carrier index and the bandwidth part index.

For a specific bandwidth part of a given carrier, the terminal can determine the search space to be monitored in consideration of the carrier index and the bandwidth part index. The terminal can perform blind decoding on the DCI in the calculated search space to obtain the DCI.

Figure 7:
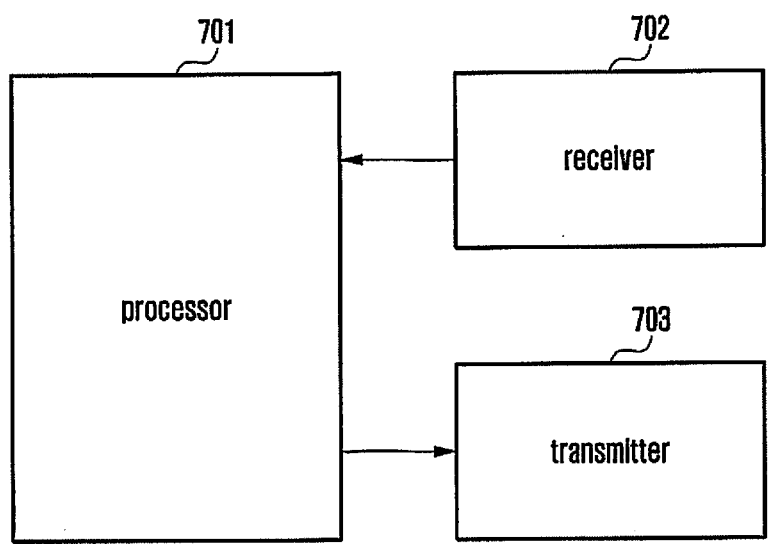
FIG. 7 is a diagram of a terminal, according to an embodiment.
Figure 8:
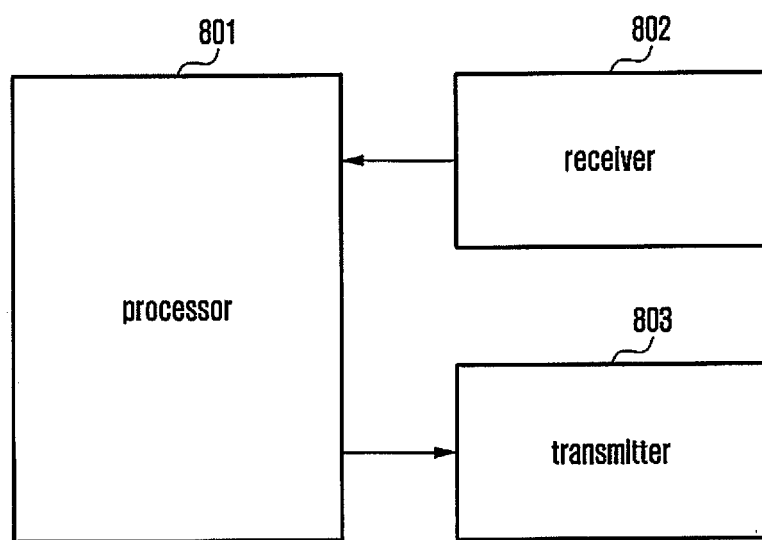
FIG. 8 is a diagram of a base station, according to an embodiment.

FIGS. 7 and 8 are diagrams of the terminal and base station, respectively. Each of the terminal and the base station includes a transmitter, a receiver, and a controller. The base station and the terminal having the above configurations should be able to perform operations for bandwidth part configuration, bandwidth part scheduling, DCI transmission, and various signaling in the 5G communication system described as embodiments.

As shown in FIG. 7, the terminal may include a processor 701, a receiver 702, and a transmitter 703. The processor 701 may include one or more processors. The processor 701 may be referred to as a controller.

The processor 701 may control the terminal to operate according to the disclosure described above. For example, the processor 701 may control the terminal to perform different decoding operations on the downlink control channel and data channel according to the information for bandwidth part configuration, bandwidth part scheduling, and DCI reception in the embodiments.

The processor 701 may control receiving configuration information for a first bandwidth part and a second bandwidth part from the base station, decoding, based on the size of the downlink control information (DCI) for the first bandwidth part, the DCI for the second bandwidth part in the control region of the first bandwidth part, and identifying an information field included in the DCI for the second bandwidth part.

The processor 701 may identify the information field based on the size information of the DCI decoded in the second bandwidth part. If the size of the DCI transmitted through the second bandwidth part is greater than the size of the DCI for the first bandwidth part, the processor 701 may control identifying the information field by determining that the information field included in the DCI for the second bandwidth part is truncated so as to match the DCI for the first bandwidth part.

If the size of the DCI transmitted through the second bandwidth part is less than the size of the DCI for the first bandwidth part, the processor 701 may control identifying the information field by determining that the information field included in the DCI for the second bandwidth part is zero padded so as to match the DCI for the first bandwidth part. The information field may correspond to at least one of a frequency resource allocation field and a time resource allocation field. The DCI for the second bandwidth part may include a bandwidth part indicator indicating the second bandwidth part.

In the terminal, the receiver 702 and the transmitter 703 may be collectively referred to as a transceiver unit. The transceiver unit can transmit and receive signals to and from the base station. The signal may include control information and data. To this end, the transceiver unit may include an RF transmitter for up-converting the frequency of a signal to be transmitted and amplifying the signal, and an RF receiver for low-noise amplifying a received signal and down-converting the frequency of the received signal. The transceiver unit may receive a signal through a radio channel and output the signal to the processor 701, and may transmit a signal output from the processor 701 through a radio channel.

As shown in FIG. 8, the base station may include a processor 801, a receiver 802, and a transmitter 803. The processor 801 may include one or more processors. The processor 801 may be referred to as a controller.

The processor 801 may control the base station to operate according to the disclosure described above. For example, the processor 801 can control the base station differently according to the operations for bandwidth part configuration, bandwidth part scheduling, and DCI transmission in the embodiments. The processor 801 can also control transmission of various additional indicators and configuration information if necessary.

The processor 801 may control transmitting configuration information for a first bandwidth part and a second bandwidth part to a terminal, generating the (DCI for the second bandwidth part whose size corresponds to the size of the DCI for the first bandwidth part, and transmitting the DCI for the second bandwidth part via the control region of the first bandwidth part.

If the size of the DCI to be transmitted via the second bandwidth part is greater than the size of the DCI for the first bandwidth part, the information field included in the DCI for the second bandwidth part may be truncated so as to match the DCI for the first bandwidth part.

If the size of the DCI to be transmitted via the second bandwidth part is less than the size of the DCI for the first bandwidth part, the information field included in the DCI for the second bandwidth part may be zero padded so as to match the DCI for the first bandwidth part. The DCI for the second bandwidth part may include an information field, and the information field may correspond to at least one of a frequency resource allocation field and a time resource allocation field. The DCI for the second bandwidth part may include a bandwidth part indicator indicating the second bandwidth part.

In the base station, the receiver 802 and the transmitter 803 may be collectively referred to as a transceiver unit. The transceiver unit can transmit and receive signals to and from the terminal. The signal may include control information and data. To this end, the transceiver unit may include an RF transmitter for up-converting the frequency of a signal to be transmitted and amplifying the signal, and an RF receiver for low-noise amplifying a received signal and down-converting the frequency of the received signal. The transceiver unit may receive a signal through a radio channel and output the signal to the processor 801, and may transmit a signal output from the processor 801 through a radio channel.

In accordance with the disclosure, a terminal can operate on the bandwidth parts using the ultra-wide bandwidth operation in the 5G communication system, and the 5G communication system can be operated more efficiently. It is possible to decrease the number of blind decodings of the terminal and reduce power consumption of the terminal.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

What is claimed is:

1. A method performed by a user equipment for communication in a communication system supporting one or more bandwidth parts, the method comprising:
   identifying a first bandwidth part for a cell and a second bandwidth part for the cell through a radio resource control signaling, wherein each of the first bandwidth part and the second bandwidth part is defined with a corresponding subcarrier spacing and frequency domain location;
   identifying a first control resource set on the first bandwidth part and a second control resource set on the second bandwidth part through the radio resource control signaling; and
   acquiring second downlink control information for the second bandwidth part based on the first control resource set on the first bandwidth part being activated,
   wherein a bandwidth part indicator, a frequency domain resource assignment, and a time domain resource assignment are included in the second downlink control information,
   wherein a number of bits of bandwidth part indicator is defined based on the radio resource control signaling,
   wherein the first bandwidth part is activated by first downlink control information, and
   wherein the first downlink control information and the second downlink control information are acquired in a user equipment specific control region.

2. The method of claim 1, wherein each of the first bandwidth part and the second bandwidth part is further defined with a corresponding bandwidth.

3. The method of claim 1, wherein a 0 value bandwidth part indicator corresponds to a first bandwidth part based on an ascending order of a bandwidth part identifier (ID).

4. The method of claim 1, wherein a highest value bandwidth part indicator is reserved, in case that a number of bandwidth parts is smaller than a number of values of bandwidth part indicators.

5. The method of claim 1, wherein a carrier indicator is further included in the second downlink control information, and
   wherein the bandwidth part indicator indicates one bandwidth part among multiple bandwidth parts configured for the cell indicated by the carrier indicator.

6. A user equipment for communication in a communication system supporting one or more bandwidth parts, the user equipment comprising:
   a transceiver; and
   a controller coupled with the transceiver and configured to:
      identify a first bandwidth part for a cell and a second bandwidth part for the cell through a radio resource control signaling, wherein each of the first bandwidth part and the second bandwidth part is defined with a corresponding subcarrier spacing and frequency domain location,
      identify a first control resource set on the first bandwidth part and a second control resource set on the second bandwidth part through the radio resource control signaling, and
      acquire second downlink control information for the second bandwidth part based on the first control resource set on the first bandwidth part being activated,
   wherein a bandwidth part indicator, a frequency domain resource assignment, and a time domain resource assignment are included in the second downlink control information,
   wherein a number of bits of bandwidth part indicator is defined based on the radio resource control signaling,
   wherein the first bandwidth part is activated by first downlink control information, and
   wherein the first downlink control information and the second downlink control information are acquired in a user equipment specific control region.

7. The user equipment of claim 6, wherein each of the first bandwidth part and the second bandwidth part is further defined with a corresponding bandwidth.

8. The user equipment of claim 6, wherein a 0 value bandwidth part indicator corresponds to a first bandwidth part based on an ascending order of a bandwidth part identifier (ID).

9. The user equipment of claim 6, wherein a highest value of bandwidth part indicator is reserved, in case that a number of bandwidth parts is smaller than a number of values of bandwidth part indicators.

10. The user equipment of claim 6, wherein a carrier indicator is further included in the second downlink control information, and
    wherein the bandwidth part indicator indicates one bandwidth part among multiple bandwidth parts configured for the cell indicated by the carrier indicator.

11. A method performed by a base station for communication in a communication system supporting one or more bandwidth parts, the method comprising:
    transmitting a radio resource control signaling including information for a first bandwidth part for a cell and information for a second bandwidth part for the cell, wherein each of the first bandwidth part and the second bandwidth part is defined with a corresponding subcarrier spacing and frequency domain location;
    identifying a first control resource set on the first bandwidth part and a second control resource set on the second bandwidth part through the radio resource control signaling; and
    transmitting second downlink control information for the second bandwidth part based on the first control resource set on the first bandwidth part being activated,
    wherein a bandwidth part indicator, a frequency domain resource assignment, and a time domain resource assignment are included in the second downlink control information,
    wherein a number of bits of bandwidth part indicator is defined based on the radio resource control signaling, wherein the first bandwidth part is activated by first downlink control information, and wherein the first downlink control information and the second downlink control information are acquired in a user equipment specific control region.

12. The method of claim 11, wherein each of the first bandwidth part and the second bandwidth part is further defined with a corresponding bandwidth.

13. The method of claim 11, wherein a 0 value bandwidth part indicator corresponds to a first bandwidth part based on an ascending order of a bandwidth part identifier (ID).

14. The method of claim 11, wherein a highest value bandwidth part indicator is reserved, in case that a number of bandwidth parts is smaller than a number of values of bandwidth part indicators.

15. The method of claim 11, wherein a carrier indicator is further included in the second downlink control information, and wherein the bandwidth part indicator indicates one bandwidth part among multiple bandwidth parts configured for the cell indicated by the carrier indicator.

16. A base station for communication in a communication system supporting one or more bandwidth parts, the base station comprising:

a transceiver; and a controller coupled with the transceiver and configured to:

transmit a radio resource control signaling including information for a first bandwidth part for a cell and information for a second bandwidth part for the cell, wherein each of the first bandwidth part and the second bandwidth part is defined with a corresponding subcarrier spacing and frequency domain location, identify a first control resource set on the first bandwidth part and a second control resource set on the second bandwidth part through the radio resource control signaling, and transmit second downlink control information for the second bandwidth part based on the first control resource set on the first bandwidth part being activated, wherein a bandwidth part indicator, a frequency domain resource assignment, and a time domain resource assignment are included in the second downlink control information, wherein a number of bits of bandwidth part indicator is defined based on the radio resource control signaling, wherein the first bandwidth part is activated by first downlink control information, and wherein the first downlink control information and the second downlink control information are acquired in a user equipment specific control region.

17. The base station of claim 16, wherein each of the first bandwidth part and the second bandwidth part is further defined with a corresponding bandwidth.

18. The base station of claim 16, wherein a 0 value of bandwidth part indicator corresponds to a first bandwidth part based on an ascending order of a bandwidth part identifier (ID).

19. The base station of claim 16, wherein a highest value bandwidth part indicator is reserved, in case that a number of bandwidth parts is smaller than a number of values of bandwidth part indicators.

20. The base station of claim 16, wherein a carrier indicator is further included in the second downlink control information, and wherein the bandwidth part indicator indicates one bandwidth part among multiple bandwidth parts configured for the cell indicated by the carrier indicator.

* * * * *